United States Patent
Laroia et al.

(10) Patent No.: US 7,778,643 B2
(45) Date of Patent: *Aug. 17, 2010

(54) POWER AND TIMING CONTROL METHODS AND APPARATUS

(75) Inventors: Rajiv Laroia, Basking Ridge, NJ (US); Junyi Li, Bedminster, NJ (US); Sathyadev Venkata Uppala, Scotch Plains, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/636,482

(22) Filed: Aug. 7, 2003

(65) Prior Publication Data

US 2004/0097254 A1 May 20, 2004

Related U.S. Application Data

(63) Continuation-in-part of application No. 10/324,194, filed on Dec. 20, 2002, now Pat. No. 6,788,963, and a continuation-in-part of application No. 10/378,563, filed on Mar. 3, 2003, now Pat. No. 6,961,595.

(60) Provisional application No. 60/401,920, filed on Aug. 8, 2002.

(51) Int. Cl.
*H04W 40/00* (2009.01)
(52) U.S. Cl. .................. 455/448; 455/436; 455/443; 455/446; 455/447; 455/450; 455/574; 455/509; 370/350; 370/343
(58) Field of Classification Search ................ 370/328, 370/311; 455/522
See application file for complete search history.

(56) References Cited

U.S. PATENT DOCUMENTS 4,679,244 A 7/1987 Kawasaki et al.

(Continued)

FOREIGN PATENT DOCUMENTS

EP 0986278 3/2000

(Continued)

OTHER PUBLICATIONS

Supplementary European Search Report—EP03785063, European Patent Office—Munich, Apr. 12, 2006.

(Continued)

*Primary Examiner*—Dwayne Bost
*Assistant Examiner*—Pierre-Louis Desir
(74) *Attorney, Agent, or Firm*—Milan I. Patel

(57) ABSTRACT

The use of multiple states of mobile communication device operation to allow a single base station to support a relatively large number of mobile nodes is described. The various states require different amounts of communications resources, e.g., bandwidth. Four supported states of operation are an on-state, a hold-state, a sleep-state, and an access-state. Each mobile node in the on-state is allocated communication resources to perform transmission power control signaling, transmission timing control signaling and to transmit data as part of a data uplink communications operation. Each mobile node in the hold-state is allocated communication resources to perform transmission timing control signaling and is provided a dedicated uplink for requesting a state transition and a shared resource for transmitting acknowledgements. In the sleep state a mobile node is allocated minimal resources and does not conduct power control signaling or timing control signaling. Data may be received in the on and hold states.

47 Claims, 11 Drawing Sheets

U.S. PATENT DOCUMENTS

| | | | |
|---|---|---|---|
| 4,833,701 A | 5/1989 | Comroe et al. | |
| 4,901,307 A | 2/1990 | Gilhousen et al. | |
| 5,056,109 A | 10/1991 | Gilhousen et al. | |
| 5,095,529 A | 3/1992 | Comroe et al. | |
| 5,128,938 A | 7/1992 | Borras | |
| 5,267,261 A | 11/1993 | Blakeney, II et al. | |
| 5,325,432 A | 6/1994 | Gardeck et al. | |
| 5,369,781 A | 11/1994 | Comroe et al. | |
| 5,387,905 A | 2/1995 | Grube et al. | |
| 5,420,909 A | 5/1995 | Ng et al. | |
| 5,450,405 A | 9/1995 | Maher et al. | |
| 5,461,645 A | 10/1995 | Ishii | |
| 5,463,617 A | 10/1995 | Grube et al. | |
| 5,465,391 A | 11/1995 | Toyryla | |
| 5,473,605 A | 12/1995 | Grube et al. | |
| 5,491,835 A | 2/1996 | Sasuta et al. | |
| 5,511,232 A | 4/1996 | O'Dea et al. | |
| 5,513,381 A | 4/1996 | Sasuta | |
| 5,542,108 A | 7/1996 | Sasuta | |
| 5,566,366 A | 10/1996 | Russo et al. | |
| 5,590,396 A | 12/1996 | Henry | |
| 5,594,948 A | 1/1997 | Talarmo et al. | |
| 5,625,882 A | 4/1997 | Vook et al. | |
| 5,627,882 A | 5/1997 | Chien et al. | |
| 5,634,197 A | 5/1997 | Paavonen | |
| 5,710,982 A | 1/1998 | Laborde et al. | |
| 5,809,401 A | 9/1998 | Meidan et al. | |
| 5,884,196 A | 3/1999 | Lekven et al. | |
| 5,982,760 A * | 11/1999 | Chen | 370/335 |
| 6,021,123 A | 2/2000 | Mimura | |
| 6,078,815 A | 6/2000 | Edwards | |
| 6,108,542 A | 8/2000 | Swanchara et al. | |
| 6,243,584 B1 | 6/2001 | O'Byrne | |
| 6,266,529 B1 | 7/2001 | Chheda | |
| 6,275,712 B1 * | 8/2001 | Gray et al. | 455/522 |
| 6,307,849 B1 | 10/2001 | Tiedemann, Jr. | |
| 6,308,080 B1 | 10/2001 | Burt et al. | |
| 6,334,047 B1 | 12/2001 | Andersson et al. | |
| 6,400,703 B1 | 6/2002 | Park et al. | |
| 6,442,152 B1 | 8/2002 | Park et al. | |
| 6,456,604 B1 * | 9/2002 | Lee et al. | 370/328 |
| 6,498,934 B1 | 12/2002 | Muller | |
| 6,546,252 B1 | 4/2003 | Jetzek et al. | |
| 6,611,506 B1 | 8/2003 | Huang et al. | |
| 6,657,988 B2 | 12/2003 | Toskala et al. | |
| 6,690,936 B1 | 2/2004 | Lundh | |
| 6,721,289 B1 * | 4/2004 | O'Toole et al. | 370/311 |
| 6,904,283 B2 | 6/2005 | Li et al. | |
| 2001/0031639 A1 | 10/2001 | Makipaa | |
| 2002/0077152 A1 | 6/2002 | Johnson et al. | |
| 2003/0117969 A1 | 6/2003 | Koo et al. | |

FOREIGN PATENT DOCUMENTS

| | | |
|---|---|---|
| KR | 2000-011693 | 2/2000 |
| RU | 2122288 | 11/1998 |
| WO | 9512297 | 5/1995 |
| WO | 9626620 | 8/1996 |
| WO | 9627993 | 9/1996 |
| WO | 9712475 | 4/1997 |
| WO | 9746038 | 12/1997 |
| WO | 9938278 | 7/1999 |
| WO | 0038457 | 6/2000 |
| WO | 0067394 | 11/2000 |
| WO | 0074292 | 12/2000 |

OTHER PUBLICATIONS

International Search Report—PCT/US2003/024772, International Search Authority—U.S. Patent Office, Mar. 11, 2004.
International Search Report—PCT/US2003/024889, International Search Authority—U.S. Patent Office, Dec. 5, 2003.
Supplementary European Search Report—EP03785015—Search Authority—Munich Patent Office, Dec. 8, 2009.

* cited by examiner

| STATE | ASSIGNMENT CHANNEL (710) | FAST PAGING CHANNEL (712) | SLOW PAGING CHANNEL (714) |
|---|---|---|---|
| ON STATE (702) | ✓ | ✓ | ✓ |
| ACCESS STATE (704) | ✓ | ✓ | ✓ |
| HOLD STATE (706) | ✗ | ✓ | ✓ |
| SLEEP STATE (708) | ✗ | ✗ | ✓ |

FIG. 7

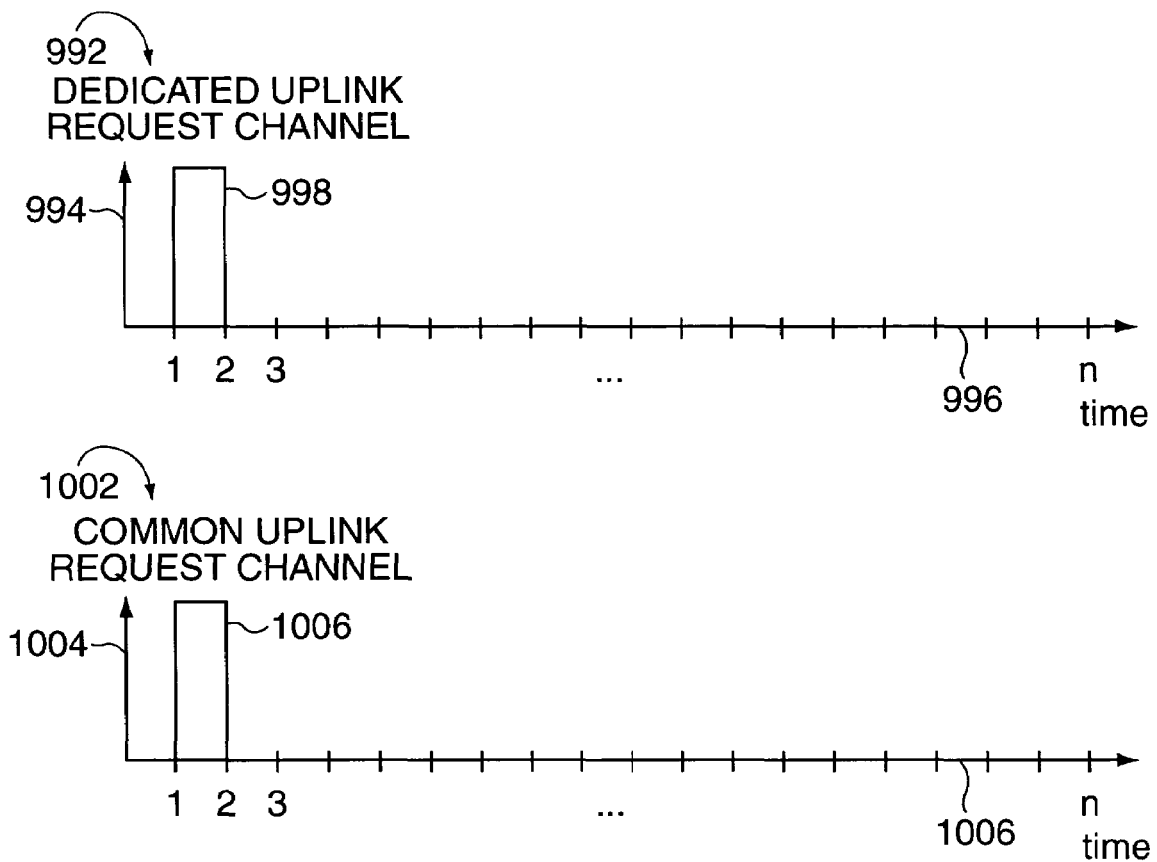

POWER AND TIMING CONTROL METHODS AND APPARATUS

RELATED APPLICATION

This application is a continuation-in-part of U.S. patent application Ser. No. 10/324,194 filed Dec. 20, 2002 now U.S. Pat. No. 6,788,963 titled "Methods and Apparatus for Operating Mobile Nodes in Multiple States" and a continuation-in-part of U.S. patent application Ser. No. 10/378,563 filed Mar. 3, 2003 now U.S. Pat. No. 6,961,595 titled "Methods and Apparatus for Operating Mobile Nodes in Multiple States" and claims the benefit of U.S. Provisional Patent Application Ser. No. 60/401,920 filed on Aug. 8, 2002, titled "Methods and Apparatus for Implementing Mobile Communications System" each of which is hereby expressly incorporated by reference.

FIELD OF THE INVENTION

The present invention is directed to wireless communications systems and, more particularly, to methods and apparatus for supporting a plurality of mobile nodes in a communications cell with limited resources.

BACKGROUND OF THE INVENTION

Wireless communications systems are frequently implemented as one or more communications cells. Each cell normally includes a base station which supports communications with mobile nodes that are located in, or enter, the communications range of the cell's base station. Within a cell or a sector of a cell, the unit of communications resource is a symbol, e.g., QPSK or QAM transmitted on one frequency tone for one time slot in an orthogonal frequency division multiplexed (OFDM) system. The total available communication resource is divided into a number of such symbols (units) which can be used for communicating control and data information between a base station and one or more mobile nodes in the cell and tends to be limited. Control signals transmitted between a basestation and a mobile node may be transmitted in two possible directions, i.e., from the basestation to the mobile node or from the mobile node to the base station. Transmission of signals from the base station to the mobile is often called a downlink. In contrast, transmission from the mobile to the base station is commonly referred to as an uplink.

In order to provide efficient use of limited communications resources, base stations may allocate different numbers of tones to different mobile nodes depending on the devices' bandwidth needs. In a multiple access system, several nodes may be transmitting data, e.g., in the form of symbols, to a base station at the same time using different tones. This is common in OFDM systems. In such systems, it is important that symbols from different mobile nodes arrive at the base station in a synchronized manner, e.g., so the base station can properly determine the symbol period to which a received symbol belongs and signals from different mobile nodes do not interfere with each other. As mobile nodes move in a cell, transmission delay will vary as a function of the distance between a mobile node and a base station. In order to make sure that transmitted symbols will arrive at a base station from different mobile nodes in synchronized manner, timing control signals, e.g., feedback signals, may be and in many cases are, transmitted to each active mobile node of a cellular system. The timing control signals are often specific to each device and represent, e.g., timing corrections of offsets to be used by the device to determine symbol transmission timing. Timing control signaling operations include, e.g., monitoring for timing control signals, decoding received timing control signals, and performing timing control update operations in response to the decoded received timing control signals.

Timing control signals can be particularly important in systems where there are a large number of mobile nodes. In order to avoid interference from a mobile node due to timing miss synchronization, it may be necessary to establish timing synchronization and control before allowing a mobile node to transmit data, e.g., voice data, IP packets including data, etc. to a base station.

In addition to managing limited resources such as bandwidth, power management is often a concern in wireless communications systems. Mobile nodes, e.g., wireless terminals, are often powered by batteries. Since battery power is limited, it is desirable to reduce power requirements and thereby increase the amount of time a mobile node can operate without a battery recharge or battery replacement. In order to minimize power consumption, it is desirable to limit the amount of power used to transmit signals to a base station to the minimal amount of power required. Another advantage of minimizing mobile node transmission power is that it has the additional benefit of limiting the amount of interference that the transmissions will cause in neighboring cells which will often use the same frequencies as an adjoining cell.

In order to facilitate transmission power control, power control signaling, e.g., a feedback loop, may be established between a base station and a mobile node. Power control signaling often takes place at a much faster rate than the timing control signaling. This is because power control signaling attempts to track variations in the signal strength between the base station and the mobile nodes and this can typically vary on the scale of milliseconds. The timing control needs to take into consideration changes in the distance between base station and the mobile nodes and this tends to vary on a much slower scale, typically hundreds of milliseconds to seconds. Thus the amount of control signaling overhead for power control tends to be much more than that for timing control.

In addition to timing and power control signaling, other types of signaling may be employed. For example mobile nodes in addition may also signal on an uplink the quality of the downlink channel. This may be used by the base station to determine the communication resource allocation to allow for the transfer of data packets from the base station to the mobile. Such downlink channel quality reports allows a base station to determine which mobile node to transmit to and if a mobile node is chosen then the amount of forward error correction protection to apply to the data. These downlink channel quality reports generally are signaled on a similar time scale as the power control signaling. As another example, signaling may be used to periodically announce a mobile node's presence in a cell to a base station. It can also be used to request allocation of uplink resources, e.g., to transmit user data in a communications session. Shared as opposed to dedicated resources may be used for such announcements and/or resource requests.

Signaling resources, e.g., time slots or tones, may be shared or dedicated. In the case of shared time slots or tones, multiple devices may attempt to use the resource, e.g., segment or time slot, to communicate information at the same time. In the case of a shared resource, each ode in the system normally tries to use the resource on an as needed basis. This sometimes results in collisions. In the case of dedicated resources, e.g., with time slots and/or tones being allocated to particular communications device or group of devices to the exclusion of other devices for a certain period of time, the problem of possible collisions is avoided or reduced. The dedicated resources may be part of a common resource, e.g., a common channel, where segments of the channel are dedicated, e.g., allocated, to individual devices or groups of devices where the groups include fewer than the total number of mobile nodes in a cell. For example, in the case of an uplink time segments may be dedicated to individual mobile nodes to prevent the possibility of collisions. In the case of a downlink, time slots may be dedicated to individual devices or, in the case of multicast messages or control signals, to a group of devices which are to receive the same messages and/or control signals. While segments of a common channel may be dedicated to individual nodes at different times, over time multiple nodes will use different segments of the channel thereby making the overall channel common to multiple nodes.

A logical control channel dedicated to an individual mobile node may be comprised of segments of a common channel dedicated for use by the individual mobile node.

Dedicated resources that go unused may be wasteful. However, shared uplink resources which may be accessed by multiple users simultaneously may suffer from a large number of collisions leading to wasted bandwidth and resulting in an unpredictable amount of time required to communicate.

While timing and power control signals and downlink channel quality reports are useful in managing communications in a wireless communications system, due to limited resources it may not be possible for a base station to support a large number of nodes when power control, and other types of signaling need to be supported on a continuous basis for each node in the system.

In view of the above discussion, it is apparent that there is a need for improved methods of allocating limited resources to mobile nodes to permit a relatively large number of nodes to be supported by a single base station with limited communications resources. It is desirable that at least some methods of communications resource allocation and mobile node management take into consideration the need for timing control signaling and the desirability of power control signaling in mobile communications systems.

SUMMARY OF THE INVENTION

The present invention is directed to methods and apparatus for supporting multiple wireless terminals, e.g., mobile nodes, using a single base station and limited resources such as bandwidth for the transmission of signals between the base station and mobile nodes, e.g., in a communications cell. A system may be implemented in accordance with the invention as a plurality of cells, each cell including at least one base station which serves multiple mobile nodes. A mobile node can, but need not, move within a cell or between cells.

In accordance with the present invention, mobile nodes support multiple states of operation. The control signaling resources used by a mobile node vary depending on the state of operation. Thus, depending on the state of the mobile node, a large amount of signaling resources may be required while in other states a minimum amount of resources may be required. Control signaling resources are in addition to data transmission resources, e.g., bandwidth used to communicate payload data such as voice, data files, etc. By supporting different mobile node states of operation, requiring differing amounts of base station/mobile node control communications resources, e.g., signal bandwidth, used for control purposes, more mobile nodes can be supported by a base station than could be supported if all mobile nodes were allocated the same amount of communications resources for control signaling purposes.

Bandwidth allocated to a particular mobile device for communicating control signals between the mobile device and a base station is known as dedicated control bandwidth. Dedicated control bandwidth may comprise multiple dedicated logical or physical control channels. In some embodiments, each dedicated control channel corresponds to one or more dedicated segments of a common control channel. Control channel segments may be, e.g., channel time slots used for transmitting and/or receiving control signals. Dedicated uplink control channel segments differ from shared uplink control channel segments where multiple devices share the same bandwidth for uplink signaling. In the case of a shared communications channel conflicts may result when multiple nodes, at the same time attempt to transmit a control signal using the shared communications channel.

Mobile nodes implemented in accordance with one exemplary embodiment support four states, e.g. modes of operation. The four states are a sleep state, a hold state, an access state, and an on state. Of these the access state is a transitory stage and the other states are steady states and the mobile nodes can be in these states for an extended period of time.

Of the four states, the on state requires the highest amount of control signaling resources, e.g., bandwidth used for control signaling purposes. In this state, the mobile node is allocated bandwidth on as needed basis for transmitting and receiving traffic data, e.g., payload information such as text or video. Thus, at any given time in the on state a mobile node may be allocated a dedicated data channel for transmitting payload information. In the on state the mobile node is also allocated a dedicated uplink control signaling channel.

In various embodiments, a dedicated uplink control channel is used during the on state by the MN to make downlink channel quality reports, communicate resource requests, implement session signaling, etc. Downlink channel quality reports are normally signaled frequently enough to track variations in the signal strength between the base station and the mobile node.

During the on state, the base station and mobile node exchange timing control signals using one or more dedicated control channels allowing the mobile node to periodically adjust its transmission timing, e.g., symbol timing, to take into consideration changes in distance and other factors which might cause the transmitted signals to drift timing from the base station's perspective, with the signals transmitted by other mobile nodes. As discussed above, the use of timing control signaling and performing timing control signaling operations, such as updating transmission timing, is important in many systems which use orthogonal frequency division multiple access in the uplink to avoid interference from transmission signals generated by multiple nodes in the same cell.

To provide transmission power control, during the on state, transmission power control signaling is employed to provide a feedback mechanism whereby a mobile node is able to efficiently control its transmission power levels based on signals periodically received from the base station with which it is communicating. In various embodiments the base station periodically transmits power control signals over a dedicated control downlink. As part of the transmission power control signaling process, the mobile node, performs various transmission power control signaling operations including, for example, monitoring for transmission power control signals directed to the particular mobile node, decoding received transmission power control signals, and updating its transmission power levels based on the received and decoded transmission power control signals. Thus, in response to receiving power control signals in a dedicated downlink segment corresponding to the particular mobile node, the mobile node adjusts its transmission power level in response to the received signal. In this manner, a mobile node can increase or decease its transmission power to provide for successful receipt of signals by the base station without excessive wastage of power and therefore reducing interference and improving battery life. The power control signaling is typically carried out sufficiently frequently to track fast variations in the signal strength between the base station and the mobile nodes. The power control interval is a function of smallest channel coherence time that the system is designed for. The power control signaling and the downlink channel quality reports are normally of similar time scale, and in general, occur at a much higher frequency than the timing control signaling. However, in accordance with one feature of the present invention the base station varies the rate at which it transmits power control signals to a mobile node as a function of the mobile node's state of operation. As a result, in such an embodiment, the rate at which the mobile node performs transmission power control adjustments will vary as a function of the state in which the mobile node operates. In one exemplary embodiment, power control updates are not performed in the sleep state and, when performed in the hold state, are normally performed at a lower rate than during the on state.

Operation of a mobile node in the hold state requires fewer control communications resources, e.g., bandwidth, than are required to support operation of a mobile node in the on state. In addition, in various embodiments while in the hold state a mobile node is denied bandwidth for transmitting payload data, but the mobile can be allocated bandwidth for receiving payload data. In such embodiments the mobile node is denied a dedicated data uplink communications channel during the hold state. The bandwidth allocated for receiving data may be, e.g., a data downlink channel shared with other mobile nodes. During the hold state timing control signaling is maintained and the mobile node is also allocated a dedicated control uplink communication resource, e.g., dedicated uplink control communications channel, which it can use to request changes to other states. This allows, for example, a mobile node to obtain additional communications resources by requesting a transition to the on state where it could transmit payload data. In some but not all embodiments, in the hold state, the dedicated uplink control channel is limited to the communication of signals requesting permission to change the state of mobile node operation, e.g., from the hold state to the on state. During the hold state the bandwidth allocated, e.g., dedicated, to a mobile node for control signaling purposes is less than in the on-state.

Maintaining timing control while in the hold-state allows the mobile nodes to transmit their uplink requests without generating interference to other mobiles within the same cell and having a dedicated uplink control resource ensures that the delays for state transition are minimal as the requests for state transitions do not collide with similar requests from other mobile nodes as may occur in the case of shared uplink resources. Since timing control signaling is maintained, when the mobile node transitions from the hold state to the on state it can transmit data without much delay, e.g., as soon as the requested uplink resource is granted, without concerns about creating interference for other mobile nodes in the cell due to drift of uplink symbol timing. During the hold state, transmission power control signaling may be discontinued or performed less frequently, e.g., at greater intervals than performed during on state operation. In this manner, the dedicated control resources used for power control signaling can be eliminated or reduced allowing fewer resources to be dedicated to this purpose than would be possible if power control signaling for all nodes in the hold state was performed at the same rate as in the on state.

When transitioning from the hold state to the on state, the mobile node may start off with an initial high power level to insure that its signals are received by the base station with the power level being reduced once transmission power control signaling resumes at a normal rate as part of on state operation. In one exemplary embodiment, when the mobile node in the hold state intends to migrate to the on state, it transmits a state transition request using a dedicated uplink communication resource, which is not shared with any other mobile nodes. The base station then responds with a broadcast message indicating its response to the mobile's state transition request. The mobile on receiving the base station message meant for it responds with an acknowledgement. The acknowledgment is transmitted over a shared resource on the uplink and is slaved to the broadcast message on the downlink.

By transmitting an appropriate state transition request the mobile may also transition to the sleep state. In one exemplary embodiment, when the mobile node does not intend to migrate to another state, the mobile node may not transmit any signal in its dedicated uplink communication channel, though the dedicated channel has been assigned to the mobile node and is therefore not used by any other mobile nodes. In another embodiment, the mobile node uses an on/off signaling in its dedicated uplink communication channel, where the mobile node sends a fixed signal (on) when it intends to migrate to another state and does not send any signal (off) when it does not intend to migrate to any other state. In this case, the transmission of the fixed signal can be interpreted as a migration request to the on state if the transmission occurs at certain time instances, and as a migration request to the sleep state if the transmission occurs at some other time instances.

In order to support a large number of mobile nodes, a sleep state requiring relatively few communications resources is also supported. In an exemplary embodiment, during the sleep state, timing control signal and power control signaling are not supported. Thus, in the sleep state, the mobile nodes normally do not performing transmission timing control or transmission power control signaling operations such as receiving, decoding and using timing and transmission power control signals. In addition, the mobile node is not allocated a dedicated uplink control resource, e.g., uplink control communications channel, for making state transition requests or payload transmission requests. In addition, during the sleep state the mobile node is not allocated data transmission resources, e.g., dedicated bandwidth, for use in transmitting payload data, e.g., as part of a communications session with another node conducted through the base station.

Given the absence of a dedicated uplink control channel during the sleep state, a shared communications channel is used to contact the base station to request resources necessary for a mobile node to initiate transition from the sleep state to another state.

In some embodiments, in the sleep state the mobile node may, at the behest of the base station serving the cell, signal its presence in the cell, e.g., using a shared communications resource. However, as discussed above, little other signaling is supported during this state of operation. Thus, very little control signaling bandwidth is used to communicate control information between mobile nodes in the sleep state and a base station serving the nodes.

The access state is a state through which a node in the sleep state can transition into one of the other supported states. The transition between states may be triggered by an action by a user of the mobile node, e.g., an attempt to transmit data to another mobile node. Upon entering the access state, transmission power control and timing control signaling has not yet been established. During access state operation, timing control signaling is established and, in various embodiments, full or partial transmission power control signaling is established. A mobile node can transition from the access state to either the on state or the hold state.

The establishment of the timing synchronization and transmission power control can take some amount of time during which data transition is delayed. Also the access process happens through a shared media and contentions between mobile nodes need to be resolved. By supporting a hold state in accordance with the present invention, in addition to a sleep state, such delays can be avoided for a number of mobile nodes, as transition from the hold state to the on state does not go through the access state, while the number of nodes which can be supported by a single base station is larger than would be possible without the use of reduced signaling states of mobile node operation.

In some embodiments, for an individual cell, the maximum number of mobile nodes that can be in the sleep state at any given time is set to be greater than the maximum number of mobile nodes that can be in the hold state at given time. In addition, the maximum number of mobile nodes which can be in the hold at any given time is set to be greater than the maximum number of nodes that can be in the on state at any given time.

In accordance with a power conservation feature of the present invention, downlink control signaling from the base station to the mobile nodes is divided into a plurality of control channels. A different number of downlink control channels are monitored by a mobile node depending on the node's state of operation. During the on state the greatest number of downlink control channels are monitored. During the hold state a smaller number of downlink control channels are monitored than during the on state. In the sleep state the smallest number of downlink control channels are monitored.

To further reduce power consumption in the mobile node associated with monitoring for control signals, in accordance with one feature of the invention control channels monitored during the hold and sleep states are implemented as periodic control channels. That is, signals are not broadcast on a continuous basis on the control channels monitored in the hold and sleep states. Thus, during the hold and sleep states the mobiles monitor for control signals at periodic intervals and save power by not monitoring for control signals at those times when control signals are not transmitted on the monitored channels. To further decrease the time a particular mobile needs to monitor for control signals during the hold and sleep states, portions, e.g., segments, of the periodic control channels may be dedicated to one or a group of mobile nodes. The mobile nodes are made aware of which control channel segments are dedicated to them and then monitor the dedicated segments as opposed to all the segments in the control channels. This allows monitoring for control signals to be performed in the hold and sleep states by individual mobile nodes at greater periodic intervals than would be possible if the mobile were required to monitor all segments of the periodic control channels.

In one particular embodiment, during the on state, mobile nodes monitor segments of an assignment channel on a continuous basis and also monitor segments of periodic fast paging and slow paging control channels. When in the hold state the mobiles monitor the fast paging and slow paging control channels. Such monitoring may involve monitoring a subset of the segments of the periodic fast and slow paging channels, e.g., segments dedicated to the particular mobile node. During the hold state in the particular exemplary embodiment the slow paging channel is monitored but not the fast paging channel or the assignment channel. The paging control channels may be used to instruct the mobile node to change states.

By limiting the number of control channels and the rate of control channel monitoring as a function of the state of operation, power resources can be conserved in accordance with the invention while operating in the hold and sleep states.

The performing of both timing and power control is not required and, depending on the communications techniques used, both timing and power control may not be implemented. In such a case, multiple states may be implemented in accordance with the invention, with the unused type control, e.g., power or timing, and the associated signaling, being omitted from the implementation of the various states of operation.

In various embodiments of the present invention different levels of power and/or timing control signaling are supported in each of at least three different states. In one case, power and timing control are performed in a first state, e.g., an on-state. Power control signaling is performed at a first power control rate in said on state using a first set of power control signaling resources. Timing control is also performed in said on-state at a first timing control rate using a first set of timing control resources. In a second state, e.g., a hold state, timing and/or power control signaling is performed. These operations are performed at a rate lower than the rate at which they are performed in the on-state or not at all. The control signaling resources, e.g., power control and timing control signaling resources, if any, used in the hold state may and sometimes are a subset of the resources used for the same type of signaling in the on state. In a third state, e.g., a sleep state, timing and/or power control signaling is not performed or, if performed, is performed at a lower rate than in the hold state. These operations, if performed, are at a rate lower than the rate at which they are performed in the on-state or not at all. The control signaling resources, e.g., power control and timing control signaling resources, if any, used in the sleep state may, and sometimes are, a subset of the resources used for the same type of signaling in the sleep state. Power control and/or timing control may be performed in some states at the same rate as in the more active state as long as at least one of power control and timing control is performed at a lower rate than in the more active state. In some embodiments, the set of control signaling resources used in each of the states for power control signaling is a subset of the resources used in the on-state. The sleep state may use a subset of the power control signaling resources used in the hold state or none at all. In some embodiments, the set of control signaling resources used in each of the states for timing control signaling is a subset of the timing control signaling resources used in the on-state. The sleep state may use a subset of the timing control signaling resources used in the hold state or none at all.

Unlike some other known systems, a wireless terminal implemented in accordance with the invention may remain in a hold or sleep state for extended periods of time, e.g., many milliseconds, e.g., 10 or more milliseconds, without transmitting any signals. This offers significant power advantages over other systems where timing and/or power control signaling rates must be maintained at far more frequent intervals.

Wireless terminal transitions between states may be controlled as a function of Quality of service information associated with one or more wireless terminals and/or quality of service information of the traffic associated with one or more wireless terminals. In this manner, different levels of quality of service may be provided to different devices or different traffic, in part, by controlling the transition of devices between states, e.g., to manage allocation of available resources in a cell to provide different devices or traffic with different quality of service levels. The wireless terminals and/or base stations in a cell may store quality of service profile information for purposes of the information being used as in input to a routine which controls state transitions.

Transitions between states, or requests to transition between states, may be triggered by input from a wireless terminal user, e.g., an attempt by a user to send or receive data by pressing a button or other input device on the wireless terminal.

In one particular exemplary implementation of a communications method implemented in accordance with the invention, a wireless terminal is operated at different times, in each one of at least three different operational states, the three different operational states including a first state, a second state and a third state. While operating in the first state the wireless terminal uses a first amount of a control communications resource used to send control signals between a base station and the wireless terminal. While operating in the second state the wireless terminal uses a second amount of the control communications resource, the second amount of the control communications resource being less than the first amount. The second amount of the control communications resource includes, in various embodiments, a dedicated uplink signaling channel and a shared downlink signaling channel used to communicate information relating to the allocation of uplink and downlink resources for the communication of data, respectively. The dedicated uplink channel may be formed from segments of a corresponding uplink control signaling channel which are dedicated to the wireless terminal so that other terminals do not use the dedicated channel segments. The shared downlink channel may be comprised of a set of downlink control channel segments which may be part of a downlink control channel which may include additional segments which are not used by the particular wireless terminal. The shared downlink channel, e.g., the segments of the downlink channel which may be used to communicate information may be monitored by multiple devices for information. Thus, in some embodiments, the dedicated uplink control signaling channel and shared downlink control signaling channel may be logical channels created from segments of larger uplink and downlink channels. In the particular embodiment, operating the wireless terminal in the third state includes using a third amount of the control communications resource which is less than said first and second amounts. The transitioning from one of said three states to another one of said three states maybe in response to a change in user activity, e.g., entry of information from a user indicating an attempt to send or receive data. In the particular exemplary embodiment said first state may be an on state, said second state may be a hold state, and said third state may be a sleep state. In various implementations of the particular embodiment, the third amount of control communications resources includes a third set of communications elements, the second amount of control communications resource includes a second set of communications elements which includes additional communications elements in addition to said third set of communications elements, and where the first amount of control communications resource includes a first set of communications elements which includes said second set of communications elements in addition to other communications elements. The communications elements may, e.g., correspond to segments of control signaling communications channels used by said wireless terminal. In some but not all implementations while operating in the second state the wireless terminal transmits at most, a small number of bits over said uplink signaling channel during any one uplink signaling transmission period. The small number of bits is, in some embodiments, at most 8 bits.

Wireless terminals may be implemented as mobile nodes such as notebook computers, personal data assistants, etc.

Numerous additional features, benefits and details of the methods and apparatus of the present invention are described in the detailed description which follows.

BRIEF DESCRIPTION OF THE DRAWINGS

FIG. 7 illustrates which control channels shown in FIG. 6 are monitored in each of the four states in which a mobile node of the present invention may operate.

DETAILED DESCRIPTION

Figure 1:
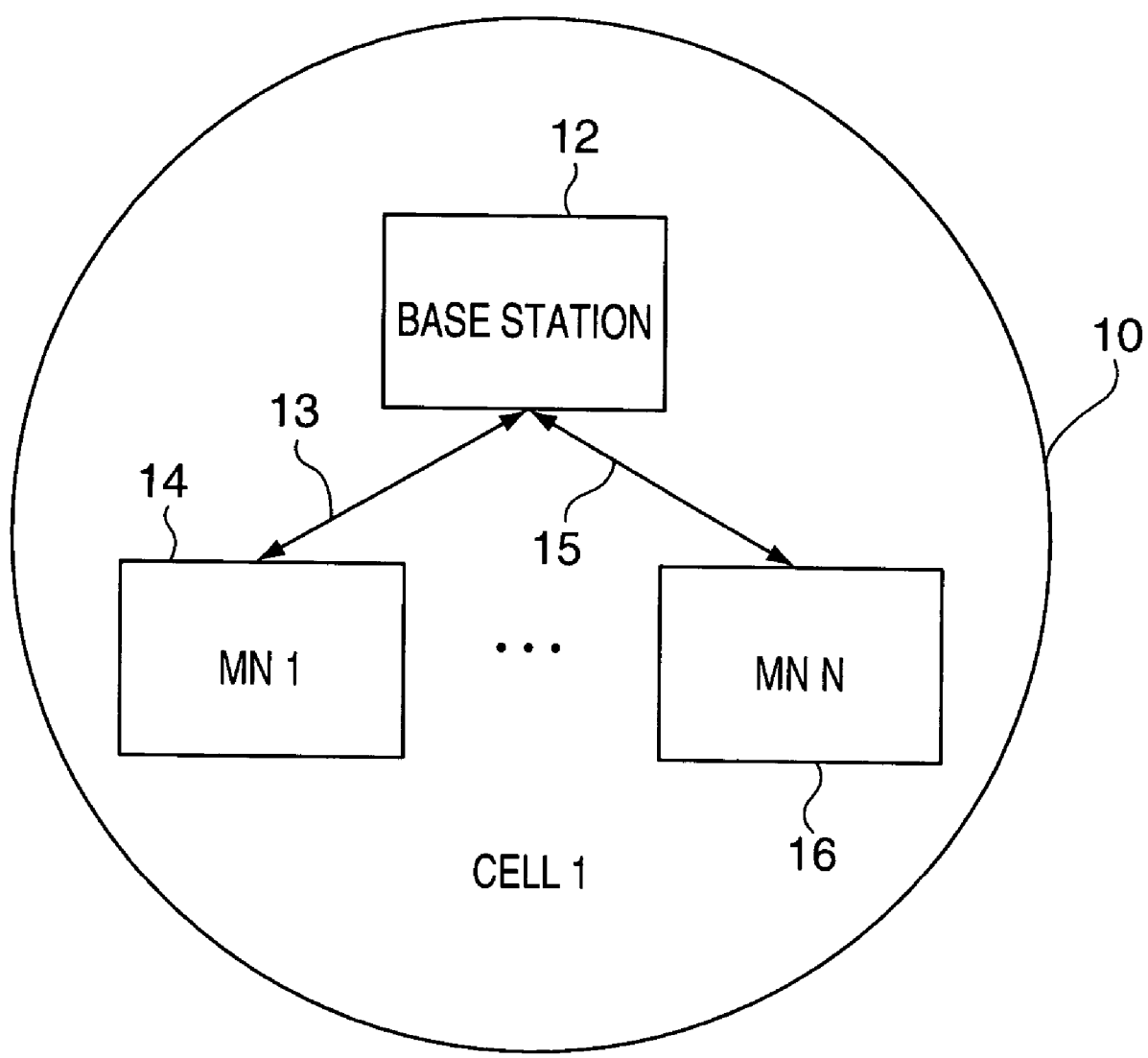
FIG. 1 illustrates an exemplary communication cell, which may be part of a communications system, implemented in accordance with the present invention.

FIG. 1 illustrates a communications cell 10 implemented in accordance with the present invention. A communications system may include multiple cells of the type illustrated in FIG. 1. The communications cell 10 includes a base station 12 and a plurality, e.g., a number N, of mobile nodes 14, 16 which exchange data and signals with the base station 12 over the air as represented by arrows 13, 15. In accordance with the invention, the base station 12 and mobile nodes 14, 16 are capable of performing and/or maintaining control signaling independently of data signaling, e.g., voice or other payload information, being communicated. Examples of control signaling include power control, downlink channel quality reports, and timing control signaling.

Figure 2:
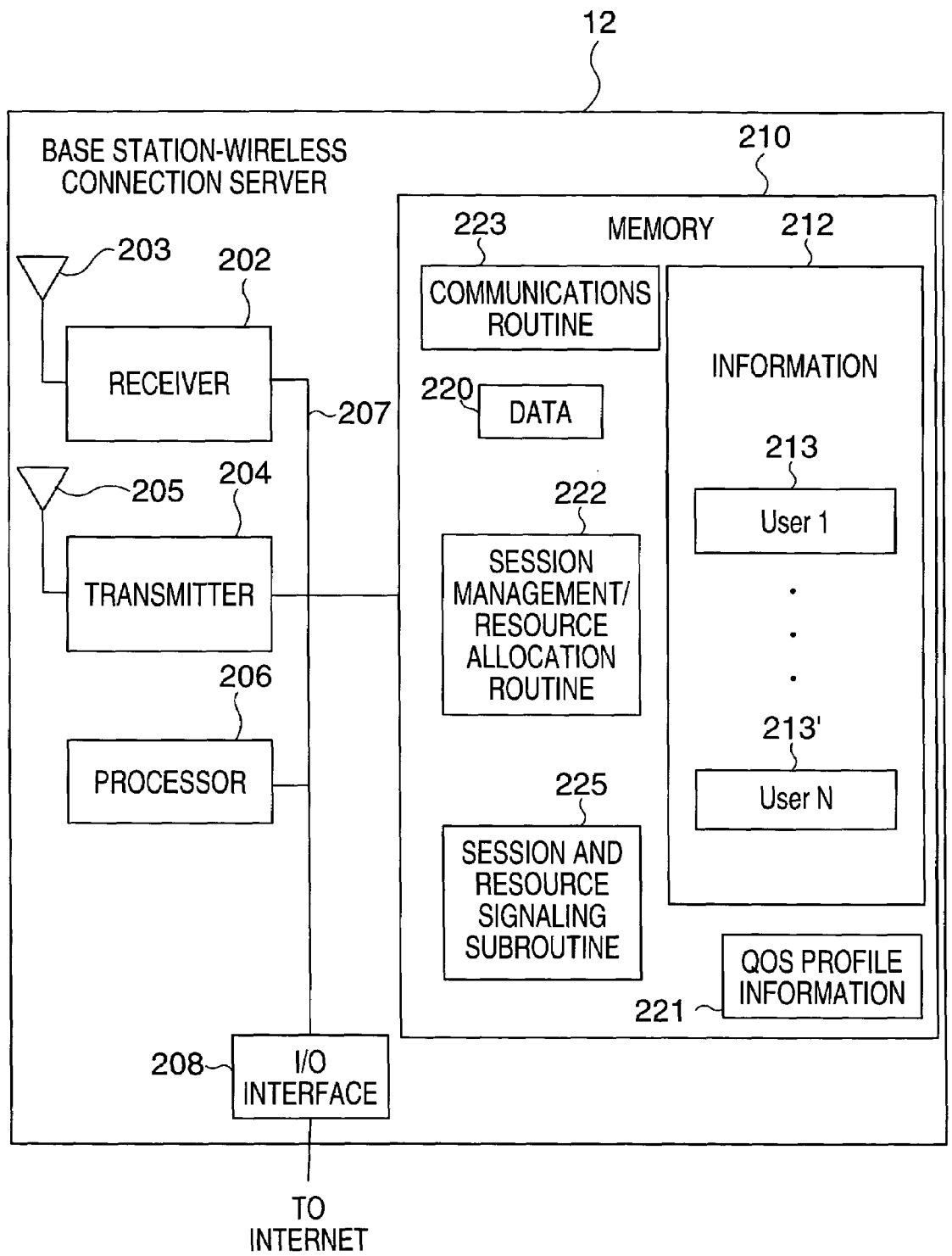
FIG. 2 illustrates a base station implemented in accordance with the present invention.

FIG. 2 illustrates a base station implemented in accordance with the present invention. As shown, the exemplary BS 12 includes a receiver circuit 202, transmitter circuit 204, processor 206, memory 210 and a network interface 208 coupled together by a bus 207. The receiver circuit 202 is coupled to an antenna 203 for receiving signals from mobile nodes. The transmitter circuit 204 is coupled to a transmitter antenna 205 which can be used to broadcast signals to mobile nodes. The network interface 208 is used to couple the base station 12 to one or more network elements, e.g., routers and/or the Internet. In this manner, the base station 12 can serve as a communications element between mobile nodes serviced by the base station 12 and other network elements.

Operation of the base station 12 is controlled by the processor 206 under direction of one or more routines stored in the memory 210. Memory 210 includes communications routines 223, data 220, session management/resource allocation routine 222, session and resource signaling subroutine 225, and active user information 212. Communications routines 223, include various communications applications which may be used to provide particular services, e.g., IP telephony services or interactive gaming, to one or more mobile node users. Data 220 includes data to be transmitted to, or received from, one or more mobile nodes. Data 220 may include, e.g., voice data, E-mail messages, video images, game data, etc.

The session management and resource allocation routine 222 operates in conjunction with subroutines 225 and active user information 212 and data 220. The routine 222 is responsible for determining whether and when mobile nodes may transition between states and also the resources allocated to a mobile node within a state. It may base its decision on various criteria such as, requests from mobile nodes requesting to transition between states, idletime/time spent by a mobile in a particular state, available resources, available data, mobile priorities etc. These criteria would allow a base station to support different quality of service (QOS) across the mobile nodes connected to it.

The session and resource signaling subroutine 225 is called by session management routine 222 when signaling operations are required. Such signaling is used to indicate the permission to transition between states. It is also used to allocate the resources, e.g., when in a particular state. For example, in the on state a mobile node may be granted resources to transmit or receive data.

Active user information 212 includes information for each active user and/or mobile node serviced by the base station 12. For each mobile node and/or user it includes a set of state information 213, 213'. The state information 213, 213' includes, e.g., whether the mobile node is in an on state, a hold state, a sleep state, or an access state as supported in accordance with the present invention, number and types of data packets currently available for transmission to or from the mobile node, and information on the communication resources used by the mobile node.

Memory 210 includes quality of service (QOS) profile information 221 which can be used by the session management/resource allocation routine when making decisions about resource allocation and how to control state transitions to reflect the allocation of available resources. The base station may use the QOS profile information associated with one or more nodes when deciding how to control resource allocations and/or state transitions.

Figure 3:
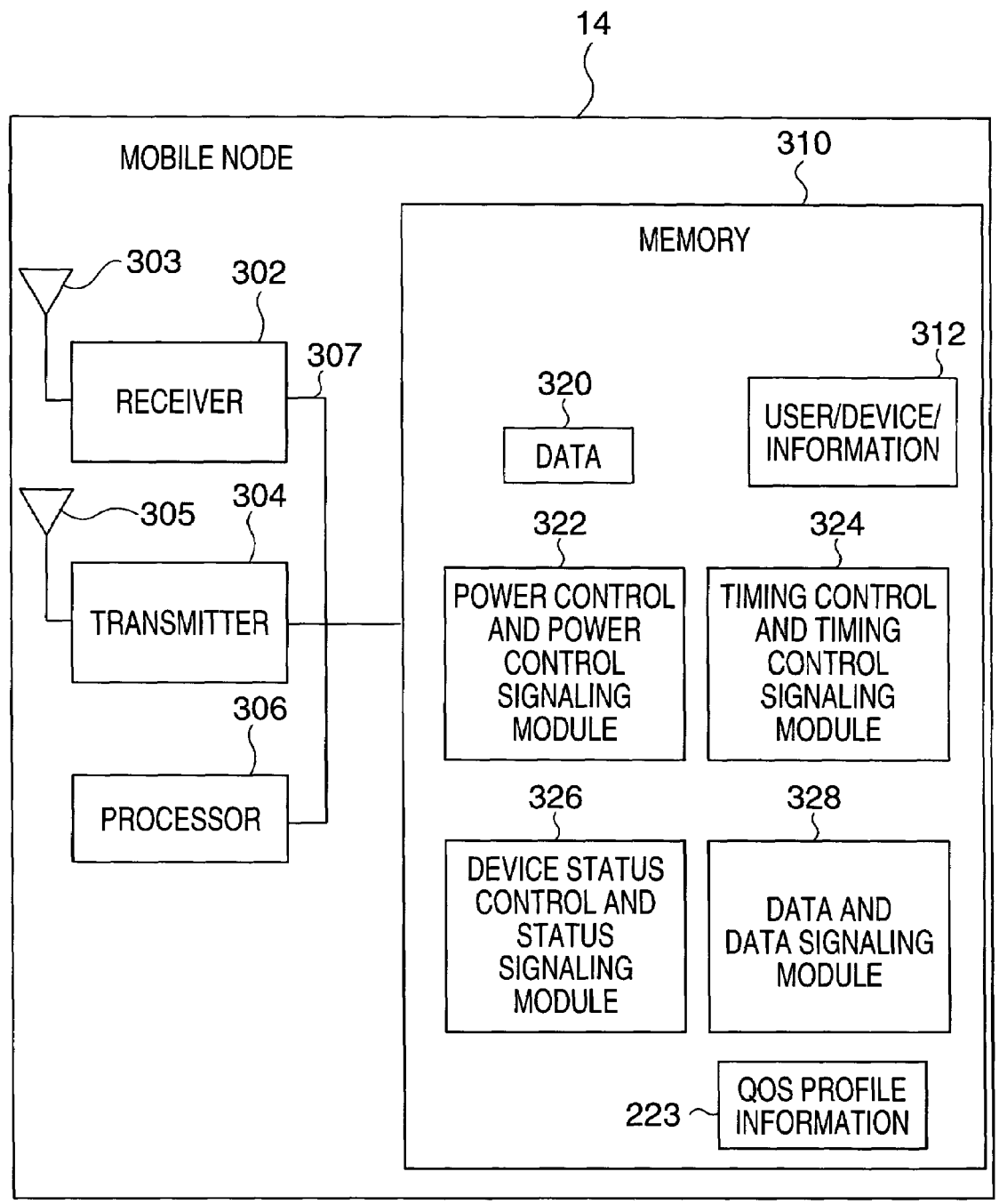
FIG. 3 illustrates a mobile node implemented in accordance with the present invention.

FIG. 3 illustrates an exemplary mobile node 14 implemented in accordance with the invention. The mobile node 14 includes a receiver 302 coupled to an antenna 303, a transmitter 304 coupled to antenna 305, a memory 310, and a processor 306 coupled together via bus 307 as shown in FIG. 3. The mobile node uses its transmitter 306, receiver 302, and antennas 303, 305 to send and receive information to and from base station 12.

Memory 310 includes user/device information 312, data 320, a power control and power control signaling module 322, a timing control and timing control signaling module 324, a device status control and status signaling module 326, a data control and data signaling module 328, and QOS profile information 323 associated with the mobile node and/or traffic QOS profile information of the traffic associated with the mobile node. The mobile node 14 operates under control of the modules, which are executed by the processor 306. User/device information 312 includes device information, e.g., a device identifier, a network address or a telephone number. This information can be used, by the base station 12, to identify the mobile nodes, e.g., when assigning communications channels. The user/device information 312 also includes information concerning the present state of the mobile device 14. The data 320 includes, e.g., voice, text and/or other data received from, or to be transmitted to, the base station as part of a communications session. QOS profile information 323 may be used by the mobile node as in input when the processor 306 makes decisions to request state transitions and/or to implement state transitions. For example, the mobile node 14 may decide to transition into a sleep state in response to detecting signals indicating resource requests from other wireless devices in the cell which have a higher QOS associated with them. Thus, QOS information 323 may include QOS information corresponding to multiple node and not just mobile node 14.

Device status control and status signaling module 326 is used for device status control and status signaling. Device status control module 326 determines, in conjunction with signals received from the base station 12, what mode, e.g., state, the mobile node 14 is to operate in at any given time. In response to, e.g., user input, the mobile node 14 may request permission from the base station 12 to transition from one state to another and to be granted the resources associated with a given state. Depending on the state of operation at any given time and the communications resources allocated to the mobile node 14, status control and status signaling module 326 determines what signaling is to occur and which signaling modules are to be active. In response to periods of reduced signal activity, e.g., control signal activity, status control and status signaling module 326 may decide to transition from a current state of operation to a state of operation requiring fewer control resources and/or requires less power. The module 326 may, but need not, signal the state transition to the base station. Status control and status signaling module 326 controls, among other things, the number of downlink control channels monitored during each state of operation and, in various embodiments, the rate at which one or more downlink control channels are monitored.

As part of the processes of controlling the state of the mobile node 14, and overseeing general signaling between the mobile node 14 and base station 12, the signaling module is responsible for signaling to the base station 12, when the mobile node 14 first enters a cell and/or when the base station 12 requests that the mobile node 14 indicate it presence. The mobile node 14 may use a shared communication resource to signal its presence to the cell's base station 12, while a dedicated communication resource may be used for other communication signals, e.g., uploading and downloading data files as part of a communication session.

Transmission power control and power control signaling module 322 is used to control the generation, processing and reception of transmission power control signals. Module 322 controls the signaling used to implement transmission power control through interaction with the base station 12. Signals transmitted to, or received from the base station 12 are used to control mobile node transmission power levels under direction of module 322. Power control is used by the base station 12 and the mobile nodes 14, 16 to regulate power output when transmitting signals. The base station 12 transmits signals to the mobile nodes which are used by the mobile nodes in adjusting their transmission power output. The optimal level of power used to transmit signals varies with several factors including transmission burst rate, channel conditions and distance from the base station 12, e.g., the closer the mobile node 14 is to the base station 12, the less power the mobile node 14 needs to use to transmit signals to the base station 12. Using a maximum power output for all transmissions has disadvantages, e.g., the mobile node 14 battery life is reduced, and high power output increases the potential of the transmitted signals causing interference, e.g., with transmissions in neighboring or overlapping cells. Transmission power control signaling allows the mobile node to reduce and/or minimize transmission output power and thereby extend battery life.

Timing control and timing control signaling module 324 is used for timing and timing signaling. Timing control is used in wireless networking schemes such as, e.g., those with uplinks based on orthogonal frequency division multiple access. To reduce the effects of noise, tone hopping may also be used. Tone hopping may be a function of time with different mobile nodes being allocated different tones during different symbol transmission time periods, referred to as symbol times. In order for a base station 12 of a multiple access system to keep track of, and distinguish between, signals from different mobile nodes, it is desirable for the base station 12 to receive information from the mobile nodes in a synchronized manner. A drift of timing between the mobile node 14 and the base station 12 can cause transmission interference making it difficult for the base station to distinguish between symbols transmitted by different mobile nodes, e.g., using the same tone, but during different symbol time periods or using different tones but during the same symbol time period.

For example, the effect on a mobile node's distance from the base station is a factor since transmissions from mobile node that are farther from the base station 12 take longer to reach the base station 12. A late arriving signal can interfere with another connection that has hopped to the late arriving signal's frequency in a latter time period. In order to maintain symbol timing synchronization, it is required to instruct a node to advance or delay its symbol transmission start time to take into consideration changes in signal propagation time to the base station.

Data and data signaling module 328 is used to control transmission and the reception of payload data, e.g., a channel or time slot dedicated to the mobile node for signaling purposes. This includes, e.g., the data packets of an Internet file transfer operation.

In accordance with the present invention, the mobile node 14 can be in one of four states. The signaling, power, and communications resources required by a mobile node will vary depending on the sate in which the mobile node is operating. As a result of using multiple states in the mobile nodes, the base station 12 is able to allocate different degrees of communication resource, e.g., control and data signaling resource, to different mobile nodes as a function of the node's state of operation. This allows the base station 12 to support a greater number of mobile nodes than would be possible if all nodes were continuously in the on state. The particular state that the mobile node 14 is in determines the control signaling and data signaling modules that are executed at any given time and also the level of control signaling between the mobile node and base station 12. The mobile node 14 can also take advantage of the different activity level in different states to save power and extend battery life.

Figure 4:
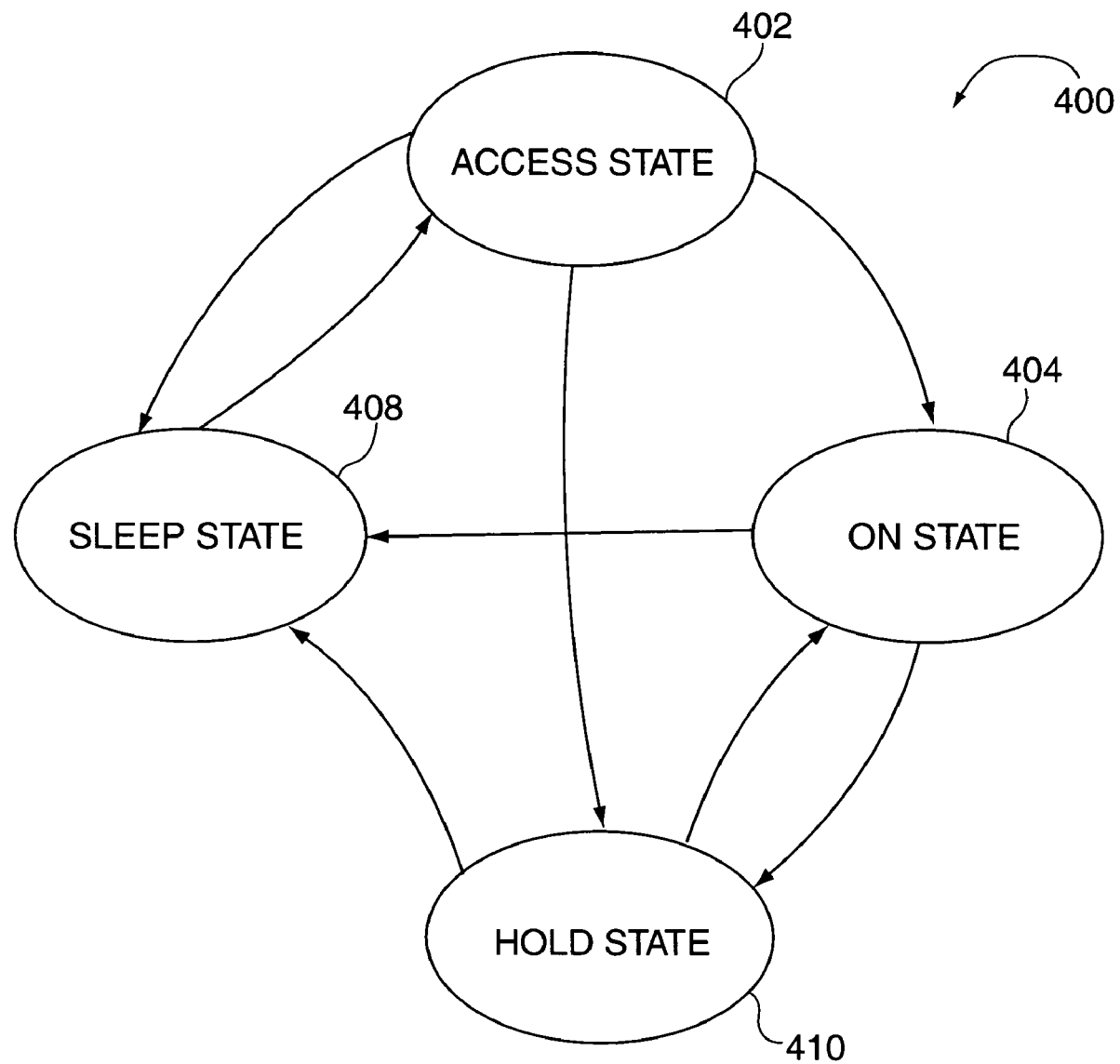
FIG. 4 is a state diagram illustrating the different states that a mobile node may enter while operating in accordance with the present invention.

Operation of the mobile nodes 14 in different states, in accordance with the present invention, will now be explained with reference to FIGS. 4 and 5. FIG. 4 illustrates a state diagram 400 including four possible states, an access state 402, a on state 404, a hold state 410 and a sleep state 408, that a mobile node 14 can enter. Arrows are used in FIG. 4 to illustrate the possible transitions between the four states.

Figure 5:
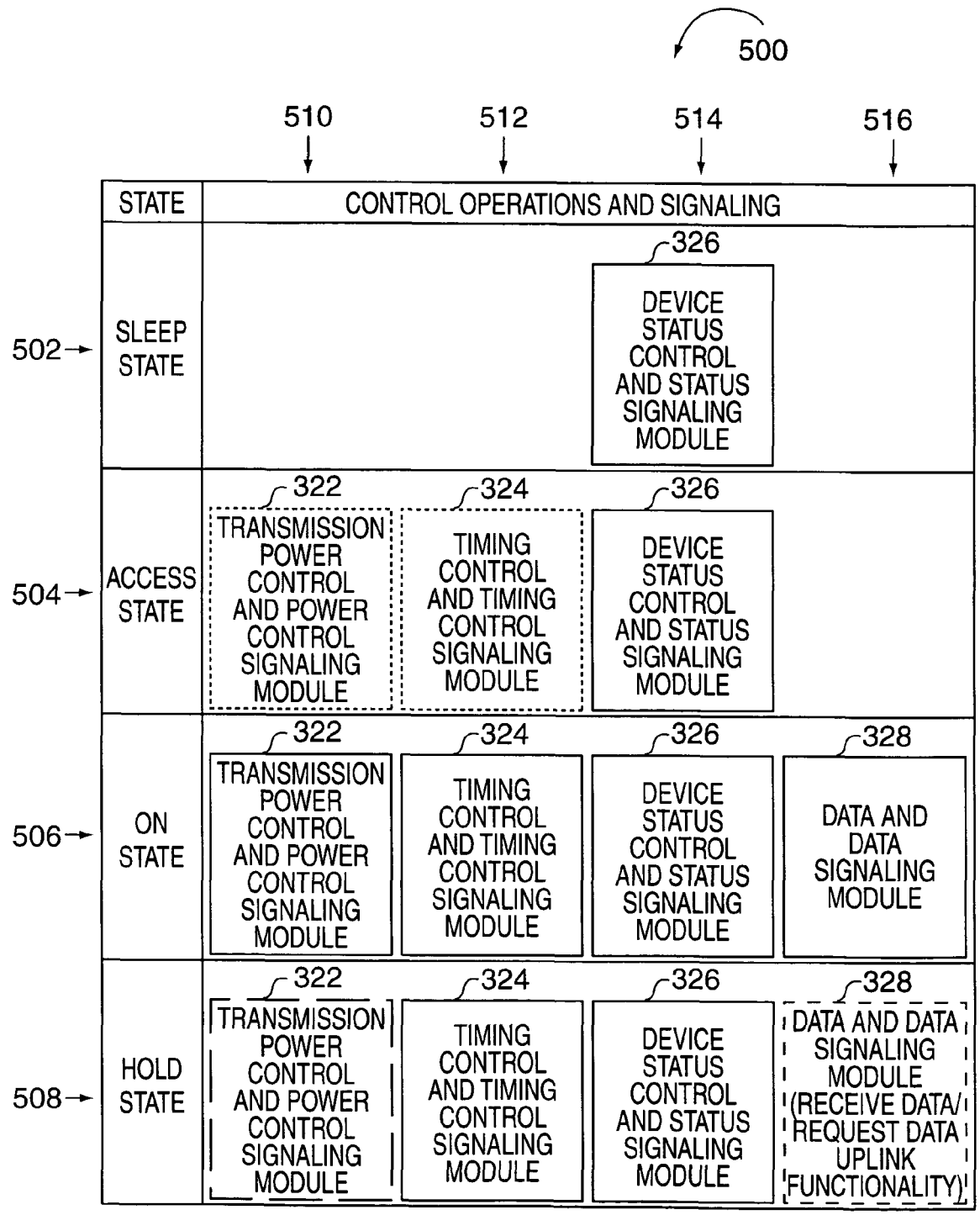
FIG. 5 is a chart illustrating various control and signaling modules that are executed by a mobile node during each of the different states illustrated in FIG. 4.

FIG. 5 illustrates the mobile node modules 322, 324, 326, 328 that are in the various states shown in FIG. 4. Each row of the chart 500 corresponds to a different state. The first through fourth rows 502, 504, 506, 508 correspond to the sleep state, access state, on state, and hold state, respectively. Each column of the chart 500 corresponds to a different module within the mobile node 14. For example, the first column 510 corresponds to the transmission power control and power control signaling module 322, the second column 512 corresponds to the timing control and timing control signaling module 324, the third column 514 corresponds to the device status control and status signaling module 326, while the last column 516 corresponds to the data and data signaling module 328. In FIG. 5, solid lines are used to indicate modules which are active in a particular state. Short dashed lines are used to indicate modules which may transition from an inactive or reduced activity level to a fully active status before the access state is exited, assuming the modules are not already fully active. Long dashed lines are used to indicate a module which may be active in a state but which may perform signaling at a reduced rate while in the indicated state as opposed to the signaling rate implemented in the on state.

From FIG. 5 it can be seen that during the sleep state the device status control and status signaling module 326 remains active but the other modules are inactive allowing for power conservation and a significantly restricting mobile node activity. In the access state 402, which serves as transition state, transmission power control and power control signaling module 322, timing control and timing control signaling module 324 will become fully active (or active at a reduced rate in the case of the transmission power control and power control signaling module 322 in some embodiments) prior to leaving the access state 402 to enter the on-state 404 or hold state 410. In the on-state, all signaling modules 322, 324, 326, 328 are fully active requiring the most power from the mobile node's perspective and the highest allocation of communication resources, e.g., bandwidth, from the base station's perspective. In the hold state, transmission power control and power control signaling module 322 may be inactive or active at a much reduced signaling rate. Timing control and timing control signaling module 324 remains alive as does the device status control and status signaling module 326. The data and data signaling module 326 is either inactive or operates to implement reduced functionality, e.g., receive data but not transmit data as part of a communication session between various nodes. In this manner, the hold state allows bandwidth and other communications resources to be conserved while, in some cases, allowing the mobile node to receive, e.g., multi-cast signals and/or messages.

Each of the states, and potential transition between states, will now be described in detail with reference to the state diagram of FIG. 4.

Of the four states 402, 404, 410, 408, the on state 404 allows the mobile node to perform the widest range of supported communications activities but requires the highest amount of signaling resources, e.g., bandwidth. In this state 404, which may be thought of as a "fully-on" state, the mobile node 14 is allocated bandwidth on an as needed basis for transmitting and receiving data, e.g., payload information such as text or video. The mobile node 14 is also allocated a dedicated uplink signaling channel which it can use to make downlink channel quality reports, communication resource requests, implement session signaling, etc. To be useful, these downlink channel quality reports should be signaled sufficiently frequently to track variations in the signal strengths received by the mobile nodes.

During the on state 404, under control of module 324, the base station 12 and mobile node 14 exchange timing control signals. This allows the mobile node 14 to periodically adjust its transmission timing, e.g., symbol timing, to take into consideration changes in distance and other factors which might cause the mobile node transmitted signals to drift timing at the base station's receiver, with respect to the signals transmitted by other mobile nodes 16. As discussed above, the use of symbol timing control signaling is employed in many systems which use orthogonal frequency division multiple access in the uplink, to avoid interference from transmission signals generated by multiple nodes in the same cell 10.

To provide transmission power control, during the on state 404, transmission power control signaling is employed, under direction of module 322, to provide a feedback mechanism whereby a mobile node is able to efficiently control its transmission power levels based on signals periodically received from the base station with which it is communicating. In this manner, a mobile node 14 can increase and/or decrease its transmission power to provide for successful receipt of signals by the base station 12 without excessive wastage of power and therefore reduced battery life. The power control signaling is carried out sufficiently frequently to track variations in the signal strength between the base station 12 and the mobile nodes 14, 16 for a certain minimum channel coherence time. The power control interval is a function of channel coherence time. The power control signaling and the downlink channel quality reports are of similar time scale, and in general, occur at much higher rate than the timing control signaling required to support vehicular mobility.

From the on state 404, the mobile node 14 can transition into either the sleep state 408 or the hold state 410. Each of these states requires reduced communication resources, e.g., bandwidth, to support than does the on state 404. The transition may be in response to user input, e.g., a user terminating a communications session or in response to the loss of communications resources, e.g., bandwidth required to support the transmission and/or receipt of information to be communicated such as voice or data information.

In accordance with the present invention, in the hold state, a mobile node is denied bandwidth for transmitting payload data. However, timing control signaling is maintained and the mobile node is also allocated a dedicated uplink communication resource which it can use to request changes to other states. This allows for instance a mobile node to obtain additional communications resources by requesting a transition to on state where it could transmit payload data. Maintaining timing control during the hold state 410 allows the mobile node 14 to transmit its uplink requests without generating interference to other mobiles 16 within the same cell 10. Having a dedicated resource for transmitting requests to the base station 12 also helps ensure that the delays for state transition are minimal as these requests do not collide with similar requests from other mobiles.

From the hold state 410, the mobile node may transition into the on state 404, e.g., upon being granted a requested communication resource. Alternatively, the mobile node can transition into the sleep state 408. Since timing control signaling is maintained in the hold state 410, when the mobile node transitions to the on state it can transmit data without much delay, e.g., as soon as the requested bandwidth is granted, without concerns about creating interference to the uplink transmission of other mobile nodes in the cell which could result from a timing drift of the mobile node.

During the hold state 410, transmission power control signaling may be discontinued or performed at greater intervals, e.g., at a similar rate as timing control. In this manner, the resource, e.g., base station to mobile node control resource, used for transmission power control signaling can be eliminated or less resource can be dedicated to this purpose than would be possible if power control signaling for all nodes 14, 16 in the hold state was performed at the same rate as in the on state. The mobile nodes 14, 16 transmission power control updates are performed in the mobile node during the hold state at a reduced rate or not at all, in a manner which corresponds to the reduced transmission power control signaling. When transitioning from the hold state 410 to the on state 404, the mobile node 14 may start off with an initial high power level to insure that its signals are received by the base station 12. The power level is then reduced once transmission power control signaling resumes at a normal (full) rate as part of on state operation.

Transition from hold state can be initiated by base station or by the mobile nodes. The base station may initiate a transition by sending a page over a paging channel meant for the hold state users. In one embodiment, the mobile decodes the paging channel with some prearranged periodicity, to check for base station messages. On finding a page message meant for it, it responds with an acknowledgement. In various embodiments the acknowledgement is transmitted over a shared resource on the uplink and is slaved to the page or grant message on the downlink. The mobile node 14 responds to a state change message by moving to the assigned state specified in the received state change message.

In one embodiment, when the mobile node 14 intends to migrate from the hold state 410 to the on state 404, it transmits a state transition request using its dedicated uplink communications channel, which is not shared with any other mobile nodes 16. Since the channel is not shared, the base station 12 is able to receive the request without interference and promptly grant the request assuming the required resources are available taking into account the priority of the user and/or the applications that the user may be using. The mobile on receiving a grant message meant for it, responds with an acknowledgement. The acknowledgment is transmitted over a shared resource on the uplink and is slaved to the grant message on the downlink.

In one exemplary embodiment, when the mobile node does not intend to migrate to another state from the hold state, the mobile node may not transmit any signal in its dedicated uplink communication resource, though the dedicated resource has been assigned to the mobile node and therefore will not be used by any other mobile nodes. In this case, the mobile node can temporarily shut down the transmission module and related functions thereby conserving power.

In another embodiment, the mobile node uses an on/off signaling in its dedicated uplink communication resource, where the mobile node sends a fixed signal (on) when it intends to migrate to another state or does not send any signal (off) when it does not intend to migrate to any other state. In this case, the transmission of the fixed signal can be interpreted as a migration request to the on state if the transmission occurs at certain time instances and as a migration request to the sleep state if the transmission occurs at some other time instances.

In order to provide reachability for a large number of mobile nodes 14, 16, the sleep state 408, requiring relatively few communications resources, is also supported. The mobile node 14 can transition into the sleep state 408, e.g., in response to user input, a period of inactivity, or a signal from the base station 12, from any of the other supported states 404, 404, 410.

In the sleep state 408 the mobile node 14 may, at the behest of the base station 12, serving the cell 10 signal its presence in the cell 10. However, little other signaling is supported during this state 408 of operation. In the exemplary embodiment, during the sleep state 408, timing control signaling and power control signaling are not supported. In addition, the mobile node is not allocated a dedicated uplink for making resource requests and is not allocated bandwidth for use in transmitting payload data, e.g., as part of a communications session with another node 16 conducted through the base station 12.

Transitions from the sleep state 408 to another state 404, 410 occur by passing through access state 402. A shared (contention based), as opposed to a dedicated uplink, communications channel is used to contact the base station 12 to request resources necessary to transition from the sleep state 408 to another state 402, 404, 410. These transitions could be initiated by the base station on the paging channel or by the mobile nodes 14, 16. Since the communications channel used to request resources to transition from the sleep state is shared, a mobile node 14 may encounter delays before being able to successfully transmit the resource request to the base station 12. This is due to possible collisions with similar requests from other mobile nodes. Such delays are not encountered in regard to transitions from the hold state 410 to the on state due to the use of a dedicated uplink resource for requests while in the hold state 410.

The access state 402 is a state through which a node 14 in the sleep state 408 can transition into one of the other supported states 404, 410. The transition out of the sleep state is normally triggered, by an action by a user of the mobile node 14, e.g., an attempt to transmit data to another mobile node 16 or by the base station 12. Upon entering the access state 402, transmission power control and timing control signaling has not yet been established. During access state operation, timing control signaling is established and, in various embodiments, full or partial transmission power control signaling is established with mobile node transmission output power levels being adjusted accordingly. A mobile node can transition from the access state 402, back to the sleep state 408 or to either the on state 404 or the hold state 410. Transition to the sleep state 408 may occur, e.g., in response to a user canceling a transmission request or a base station 12 denying the node the resources required to complete the transition to the hold or on states 404, 410. Transition from the access state to the on state 404 or hold state 410 normally occurs once the mobile node 14 has restored power and timing synchronization signaling with the base station 12 and has been granted the communications resource or resources required to maintain the state into which the mobile node 14 is transitioning.

The establishment of the timing synchronization and transmission power control signaling, in the access state 402, can take some amount of time during which data transmission is delayed. Furthermore, as noted above, delays may result form the use of a shared resources to request the transition which can produce contentions between mobile nodes which take time to resolve. In addition, because of the use of shared resources in requesting a state transition, it is difficult to prioritize between different nodes requesting state transition.

In some embodiments, for an individual cell 10, the maximum number of mobile nodes 14, 16 that can be in the sleep state 408 at any given time is set to be greater than the maximum number of mobile nodes 14, 16 that can be in the hold state 410 at given time. In addition, the maximum number of mobile nodes 14, 16 which can be in the hold state 410 at any given time is set to be greater than the maximum number of nodes that can be in the on state 404 at any given time.

By supporting a hold state in accordance with the present invention, in addition to a sleep state, such delays can be avoided for a number of mobile nodes 14, 16, as transition from the hold state 410 to the on state 404 does not go through the access state, while the number of nodes which can be supported by a single base station 12 is larger than would be possible without the use of the reduced signaling hold state.

From a power standpoint it is desirable that the amount of time and thus power a mobile node spends monitoring for control signals be minimized. In order to minimize the amount of time and power a mobile node spends monitoring for control signals, at least some downlink control signaling, i.e., signaling from the base station to one or more mobile nodes, is performed using multiple control channels. In one embodiment of the invention, particularly well suited for use with mobile nodes capable of supporting multiple states of operation, a plurality of control channels are provided for communicating control signals from the base station to the mobile nodes. Each of the plurality of common control channels is divided into a number of segments, e.g., time slots, where each segment is dedicated, e.g., assigned, for use by one or a group of mobile nodes. In this case, a group of mobile nodes may be, e.g., a subset of the mobile nodes in the system which correspond to a multicast message group. In such an embodiment, the control channels are common to multiple nodes, but each segment of a channel is dedicated, e.g., corresponds to, a particular one of the mobile nodes or group of mobile nodes with other mobile nodes being excluded from using the dedicated segments. The dedicated segments of a common control channel corresponding to an individual mobile node represent a dedicated control channel allocated to the individual mobile node.

The pattern of control channel segment allocation is made known to the individual mobile nodes 14, 16 in a cell, e.g., based on information transmitted to each particular node 14, 16 from the base station 12.

To provide particularly efficient control channel signaling, base station to mobile node control signaling may be performed at several different rates, with a different control channel being used for each of the different control channel signaling rates.

In order to minimize the amount of power and resources consumed by the task of monitoring control channels for information relevant to a mobile node, each mobile node need only monitor to detect signals in control channel segments assigned to the particular node. This allows the mobile nodes to schedule control channel monitoring operations so that the control channels need not be monitored on a continuous basis while still allowing the mobile nodes to receive control signals in a timely manner.

In one embodiment which is particularly well suited for use where mobile nodes that support at least an on state, a hold state and a sleep state, three different segmented control channels are used. The three control channels include an assignment control channel, a fast paging control channel, and a slow paging control channel.

The fast paging control channel and slow paging control channel are periodic in nature, e.g., control signals are not transmitted in terms of time on a continuous basis in these channels. Thus, mobile nodes need not spend power and resources monitoring these channels on a continuous basis. In some embodiments, to further reduce the amount of time and power a mobile needs to spend monitoring the fast and slow paging channels, the channels are segmented and the segments are dedicated to particular mobile nodes or groups of mobile nodes.

In order to minimize the amount of power and resources consumed by the task of monitoring control channels for information relevant to a mobile node, each mobile node need only monitor to detect signals in the fast and slow paging control channel segments assigned to the particular node. This allows the mobile nodes to schedule control channel monitoring operations so that the control channels can be monitored on a less frequent basis than would be possible if all segments need to be monitored for control signals.

Figure 6:
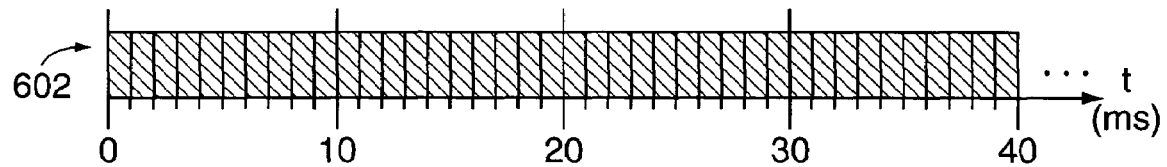
FIG. 6 illustrates the transmissions associated with three exemplary downlink control channels used in accordance with one embodiment of the present invention.
Figure 6:
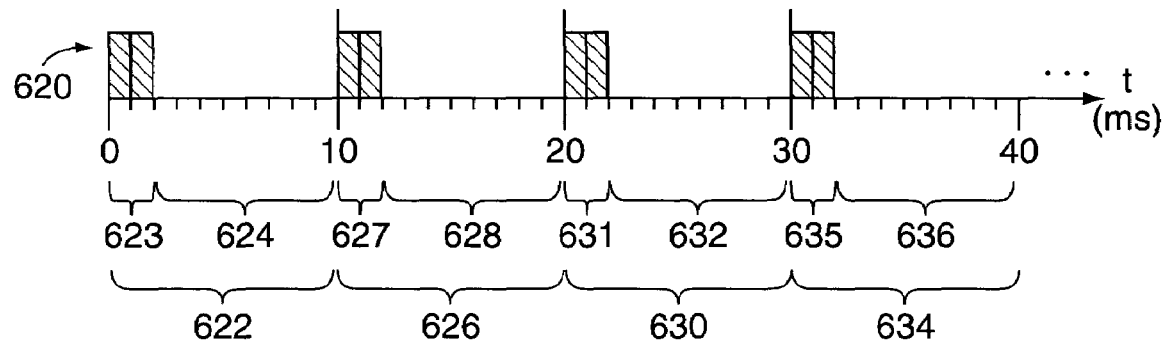
Figure 6:
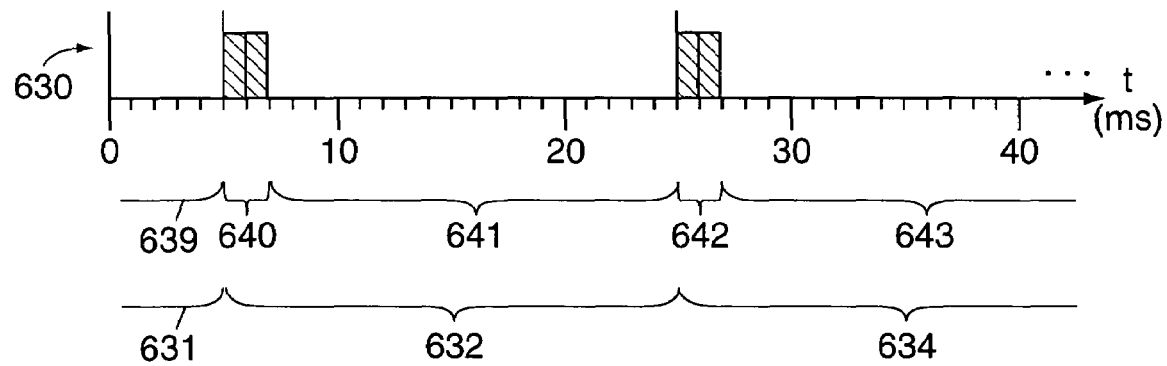

FIG. 6 illustrates control signals 602, 620, 630 corresponding to exemplary assignment, fast paging and slow paging downlink control channels respectively. The fast paging control channel signal 602 is divided into a plurality of segments, e.g., 1 ms time slots. Transmission in the assignment channel occurs, in the FIG. 6 embodiment, on a continuous basis. For each time slot, there is a corresponding traffic channel segment or segments. Traffic channel segments are allocated by the base station 12 to mobile nodes 14, 16 by transmitting a mobile node identifier or mobile node group identifier in a time slot to indicate that the corresponding traffic segment or segments have been assigned for use to the mobile node(s) corresponding to the transmitted identifier. While in the on state mobile nodes 14, 16 monitor the assignment channel on a continuous basis, e.g., at a rate sufficient to detect the identifier included in each segment of the control channel used for traffic assignment purposes.

During the on state, in addition to the assignment channel each mobile node 14, 16 monitors the periodic fast paging and slow paging channels.

In FIG. 6, fast paging signal 620 can be seen to be periodic in nature. Each exemplary fast paging signal period 622, 626, 230, 634 is 10 ms in duration. However, of this 10 ms period, the fast paging signal is actually transmitted for only a fraction of the full period, e.g., 2 ms. The periods 623, 627, 631, 635 in which the fast paging signal is transmitted are segmented into time slots. The remaining portions 624, 628, 632, 636 represent portions of time in which the fast paging control signal is not broadcast by the base station 12. While only two 1 ms segments are shown in each fast paging on period 623, 627, 631, 635 it is to be understood that there are normally several segments per on period.

To reduce the amount of time mobile nodes 14, 16 need monitor for fast paging control signals, fast paging control channel segments are, in some embodiments, dedicated to individual mobile nodes or groups of mobile nodes. The information on which segments are dedicated to which mobile nodes is normally conveyed to the mobile nodes 14, 16, e.g., form the base station 12. Once the dedication information is known, the mobile nodes 14, 16 can limit their monitoring of fast paging channel segments to segments which are dedicated to them. In such embodiments, mobile nodes can monitor the fast paging channel at periodic intervals greater than the fast paging period without risking missing control information transmitted to the mobile on the fast paging channel.

The segments of the fast paging channel are used to convey information, e.g., commands, used to control the mobile node to transition between states. The segments of the fast paging channel can also be used to instruct the mobile node to monitor the assignment channel, e.g., when the mobile node is in a state which has caused it to stop monitoring the assignment channel. Since the mobile nodes of the system know which segments of the fast paging channel are assigned to them, commands may be included in the fast paging channel segments without mobile node identifiers making for an efficient transmission scheme.

The slow paging channel is segmented and used to convey information in the same manner as the fast paging channel. The information conveyed using the slow paging channel may be the same as, or similar to, the information and commands that are transmitted using the fast paging channel.

In FIG. 6, signal 630 represents an exemplary slow paging channel signal. Note that the full slow paging signal period 632 is longer than the paging period 622 of the fast paging channel. Reference numbers 631 and 634 are used in FIG. 6 to show portions of a slow paging period. Given that the slow paging period is longer than the fast paging period, the time between control signal transmission in the slow paging channel tends to be greater than in the fast paging channel. This means that the mobile node may discontinue monitoring the slow paging channel for longer intervals than is possible with the fast paging channel. It also implies, however, that it may take, on average, longer for a control signal transmitted on the slow paging channel to be received by the intended mobile node.

In FIG. 6, two slow paging signal transmission on signal periods 640, 642 are shown. Signal periods 639, 641, 643 correspond to slow paging channel signal periods during which no slow paging signal is transmitted.

Since the fast and slow paging channels are period in nature, if the transmission on periods are staggered so that they do not overlap, the fast and slow paging channels may be implemented using the same physical transmission resources, e.g., tones, with the tones being interpreted as corresponding to either the fast or slow paging channel depending on the time period to which the tones correspond.

The spacing between segments allocated to a particular mobile node in the slow paging channel are often, but need not be, greater than in the fast paging channel. This generally means, in terms of time, that a mobile device needs to monitor the slow paging channel at intervals which are more widely spaced than the intervals at which the fast paging channel is monitored. As a result of the greater spacing of the segments in the slow paging channel, power required to monitor this channel is normally less than that required to monitor the fast paging channel.

In accordance with one embodiment of the present invention different numbers of downlink control channels are monitored in different states. In such embodiments, the assignment, fast paging and slow paging channels are not monitored in all states. Rather, in the on state the greatest number of downlink control channels are monitored, fewer downlink control channels are monitored in the hold state and the lowest number of downlink control channels are monitored in the sleep state.

FIG. 7 shows a table 700 which illustrates the three exemplary base station to mobile node (downlink) control signaling channels and the corresponding four exemplary mobile node states of operation discussed above. In the table 700, a check is used to show control channels which are monitored for a given state while an X is used to indicate a control channel which is not monitored. A dashed check is used to show a control channel which may not be monitored during a portion of the time in that state but is monitored for at least a portion of the time in the state.

From FIG. 7 the first row 702 corresponds to the on state, the second row 704 corresponds to the access state, the third row 706 corresponds to the hold state and the fourth row 708 corresponds to the sleep state. Columns in the table 700 correspond to different segmented control channels. The first column 710 corresponds to the assignment channel, the second column 712 corresponds to the fast paging channel, while the third column 714 corresponds to the slow paging channel.

As can be seen from the table 700, while in the on state a mobile node 14, 16 monitors the assignment channel, fast paging control channel and slow paging control channel. For a portion of the access state, which represents a transition between the on state and either the hold state or the sleep state, the assignment and fast paging channels are monitored. The slow paging channel is monitored for the full period of time the mobile node remains in the access state. As discussed above, monitoring of the fast paging and slow paging channels requires a mobile node to be actively engaged in monitoring on a periodic, as opposed to a continuous, basis.

While in the hold state, the assignment channel is not monitored. However, the fast paging channel and slow paging channel are monitored. Accordingly, a mobile node in the hold state can be instructed to change states and/or monitor the assignment channel for traffic channel segment assignment information in a relatively short period of time.

In the sleep state, of the three control channels shown in FIG. 6, only the slow paging channel is monitored by the mobile node. Accordingly, a mobile node 14, 16 in the hold state can be instructed to change states and/or monitor the assignment channel for traffic channel segment assignment information but such instructions may take longer to be detected, on average, than when in the hold state.

By decreasing the number of control channels that are monitored as operation proceeds from the on state to the less active sleep state, mobile node monitoring and processing resources, and thus power consumption, can be effectively controlled. Thus, the sleep state requires less mobile node resources, including power, than the hold state. Similarly, the hold state requires less mobile node resources, including power, than the on state.

Mobile node transitions from active to less active states of operation may occur in response to commands to change states received from a base station. However, in various embodiments of the invention such transitions are also initiated by mobile nodes 14, 16 in response to detecting periods of downlink control signal inactivity or reduced activity pertaining to the mobile node.

In one embodiment of the invention, activity relating to a mobile node 14, 16 on the control channel which will cease to be monitored if the mobile node reduces its state of activity by one level is used to determine when the mobile node should, on its own, switch to the lower activity level state of operation. For example, in the case of the on state, a mobile node monitors the assignment channel for signals directed to it. When failing to detect signals on the assignment channel for a preselected period of time, or a reduced message level for a period of time, the mobile node 14, 16 switches from the on state to the hold state and ceases to monitor the assignment channel.

While in the hold state, the mobile node 14, 16 monitors the fast paging channel for activity to determine, among other things, if it should switch to a lower activity state of operation, e.g., the sleep state. When failing to detect signals for a preselected period of time, or a reduced signal level for a period of time, the mobile node 14, 16 switches from the hold state to the sleep state and ceases to monitor the fast paging channel.

Figure 8:
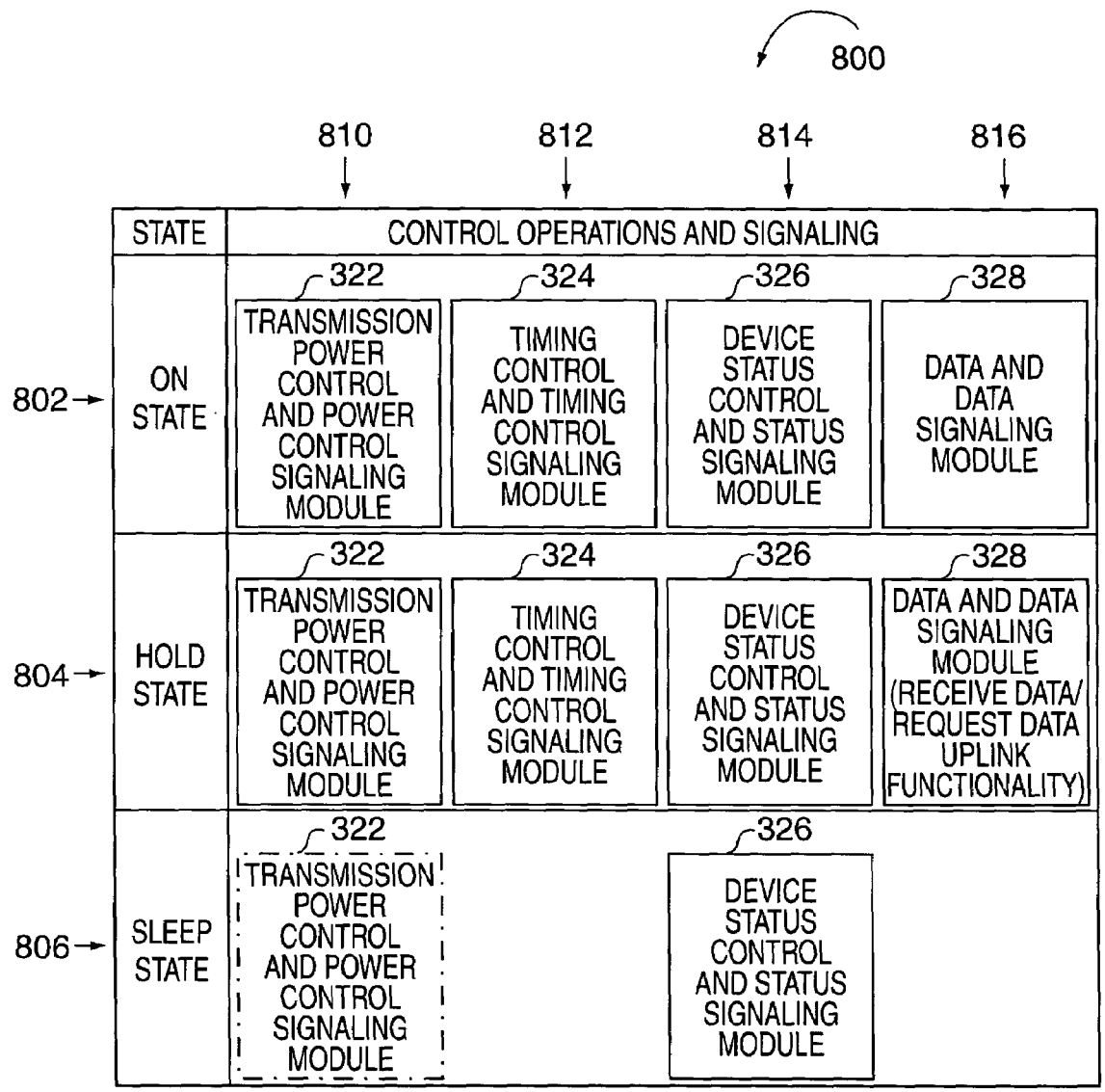
FIG. 8 is a chart illustrating various control and signaling modules that are executed within an exemplary wireless terminal, in accordance with the invention, for each of the three states: on, hold, sleep.
Figure 9A:
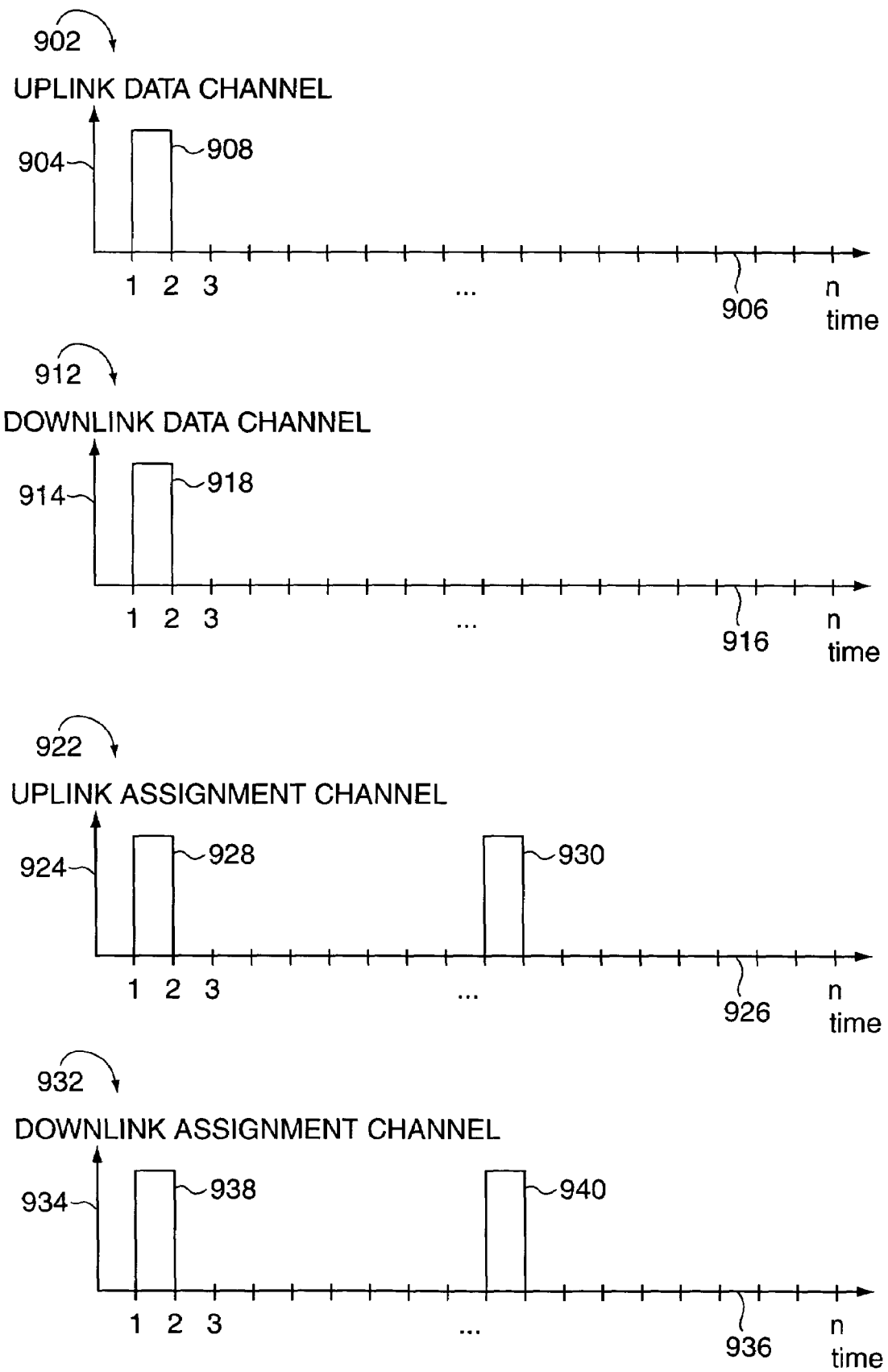
FIG. 9 illustrates exemplary uplink and downlink channels and exemplary transmission segments, corresponding to each channel, which may be used to transmit signal.
Figure 9B:
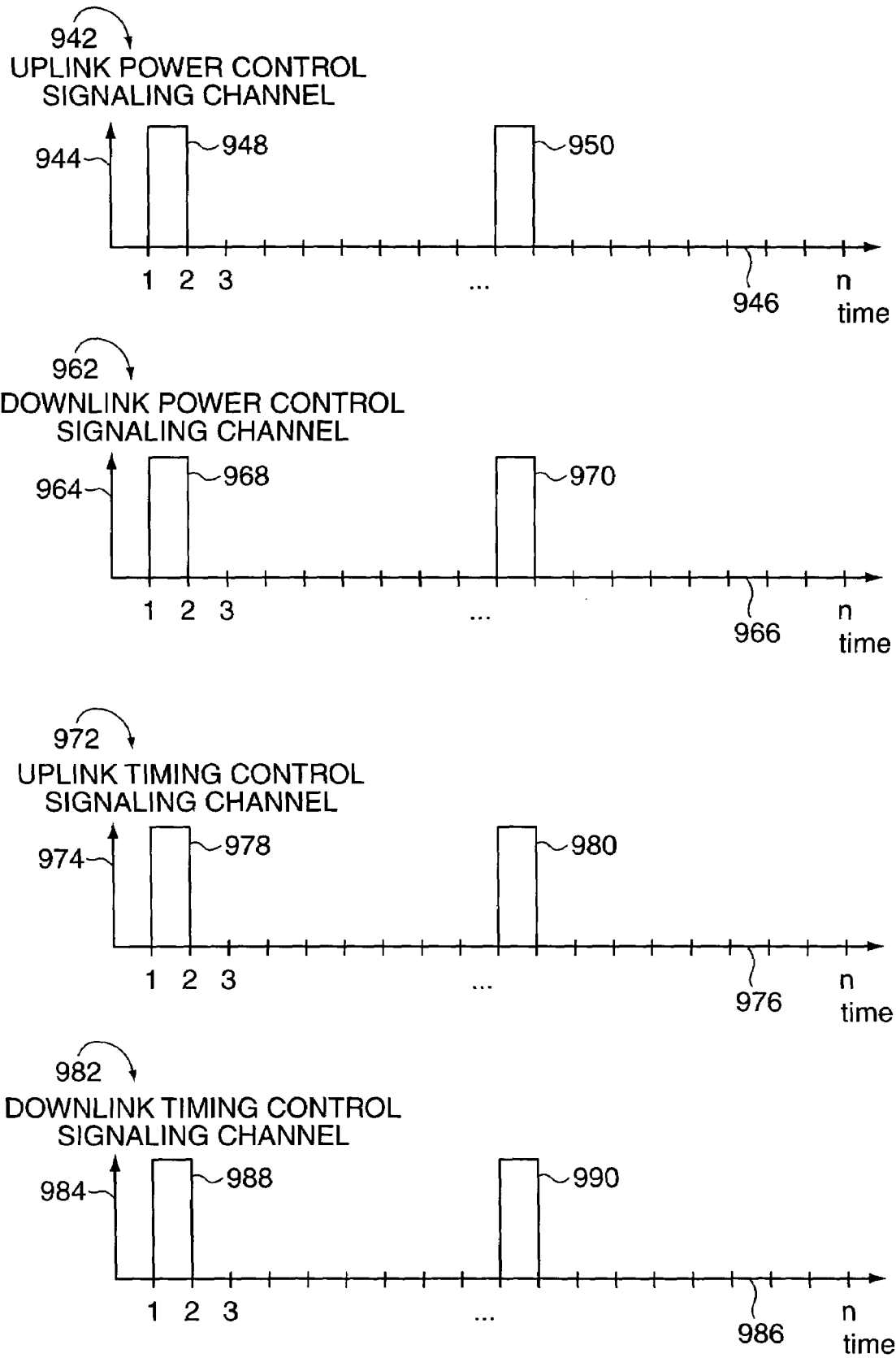

The wireless terminal can be controlled to operate at different times in different operational states including an on state, a hold state, and a sleep state. Table 800 of FIG. 8 illustrates the control operations and signaling within the wireless terminals for each of the three states, on, hold, and sleep in a particular exemplary embodiment. First row 802 corresponds to the on state; second row 804 corresponds to the hold state; third row 806 corresponds to the sleep state. Each column of Table 800 refers to a module in the wireless terminal. First column 810 corresponds to the transmission power control and power control signaling module 322; second column 812 refers to timing control and timing control signaling module 324; third column 814 corresponds to device status control and status signaling module 326; fourth column 816 corresponds to data and data signaling module 328.

Operation of the transmission power control and power control signaling module 322 may include generating and processing power control information, communicating, e.g. transmitting and receiving, power control signaling between the wireless terminal and a base station. Operation of the timing control and timing control signaling module 324 may include generating and processing timing control information, communicating, e.g. transmitting and receiving, timing control signaling between the wireless terminal and a base station. Operation of the device status control and status signaling module 326 may include generating and processing status control information such as state, and uplink requests for change of state or requests for more resources. Operation of the data and data signaling module 328 may include generating and processing data, e.g., user data, processing uplink and downlink assignment information, e.g., uplink assignments or grants to user requests and communicating, e.g. transmitting and/or receiving user data and uplink/downlink assignment information.

If the module is used, in accordance with the invention, during the state, it is shown with a solid line border in the row corresponding to the state. If the module is optionally used in some embodiments of the invention, and not used in other embodiments, the module is shown as with a dashed line border in the row corresponding to the state. If the module is not used in the given state, it is not shown in the row corresponding to that state. In the on state, transmission power control and power signaling module 322, timing control and timing control signaling module 324, device status and control and status signaling module 326, and data and data signaling module 328 are used. In the hold state, modules 322, 324, 326, and 328 are used. In the hold state, transmission power control and power control signaling module 322 is optionally used in some embodiments. However, in the hold state, the data and data signaling mode the module 328 operates on received data from the base station and cannot send uplink data to the base station. In the sleep state, device status control and status signaling module 326 is used and transmission power control and power control signaling module 322 is optionally used in some embodiments.

Transition between states may be initiated in response to a change in user activity including entry of user input through a wireless terminal input device. When a wireless terminal is operated in a sleep state or a hold state, there may be, in some embodiments, a period of 10 msec or longer during which the wireless terminal does not transmit signals. This is in contrast to some known systems which require signals periodically, e.g., at intervals of about 1 ms even in low power modes of operation. In some embodiments, the base station controls the transition between states of a wireless terminal within its cell as a function of one or more various profiles associated with the wireless terminal such as Quality of Service profile and traffic Quality of service profile. In other embodiments, the wireless terminal controls its transitions between states as a function of one or more various profiles associated with the wireless terminal such as Quality of Service profile and/or traffic Quality of service profile. Such Quality profiles may, and in various embodiments are, stored in the base station and/or wireless terminal.

Operating the wireless terminal in different states requires different levels of communication resources, e.g., communications bandwidth, including channels which include communication channel segments used by the wireless terminal. Communication channel segments are typically allocated by the base station to wireless terminals and may be allocated as a dedicated segment, e.g., assigned to one wireless terminal, or as a shared or common segment, e.g., assigned or made available to a plurality of wireless terminals. In some embodiments, operating the wireless terminal in the on state uses the most control signaling resources, operating in the hold state uses a subset of the on state control signal resources, and operating in the sleep state requires a subset of the hold state control signaling resources. Such communications resources, e.g., control channel resources, may include uplink and downlink control signaling channel segments.

Each channel includes a plurality of transmission segments which can be used to transmit signal. Each segment may correspond to one or more units of communication bandwidth, e.g., where communication bandwidth may be 1 tone for a particular time period such as a symbol time. Channels may include uplink data channels, downlink data channels, uplink assignment channels, downlink assignment channels, uplink power control information signaling channels, downlink power control signaling channels, uplink timing control signaling channels, downlink timing control signaling channels, dedicated uplink request channels, and common uplink request channels. Control signaling on the downlink may be by transmitting messages, e.g., on a paging channel, which are monitored by one or more wireless terminals.

In one embodiment channel segments for a wireless terminal are allocated from various channels during various states as follows:

sleep state—common uplink request channel;

hold state—common uplink request channel, dedicated uplink request channel (primary choice for uplink requests), downlink assignment channel, downlink data channel, uplink power control channel (low rate), downlink power control channels (low rate), uplink timing control channel (low rate), downlink timing control channel (low rate);

on state—common uplink request channel, dedicated uplink request channel, downlink assignment channel, downlink data channel, uplink power control channel (high rate), downlink power control channel (high rate), uplink timing control channel (high rate), downlink timing control channel (high rate), uplink assignment channel, uplink data channel.

Graph 902 shows an exemplary uplink data channel 904 on the vertical axis and time, represented by n segments, 906 on the horizontal axis. Graph 902 also shows an exemplary uplink channel segment 908 that may be used for transmitting uplink data signals including user data from a wireless terminal to a base station. When the wireless terminal is in the on state, wireless terminals may be assigned uplink data channel segments and uplink data signaling may occur. Data and data signaling module 328 is active in the wireless terminal during this operation. In the hold state, the base station allocates zero uplink data channel segments 908, e.g., zero user data uplink resources to the wireless terminal.

Graph 912 shows an exemplary downlink data channel 914 on the vertical axis and time, represented by n segments, 916 on the horizontal axis. Graph 912 also shows an exemplary downlink data channel segment 918 that may be used for transmitting downlink data signaling, including data from a base station to one or a plurality of wireless terminals. If the wireless terminals are in either the On state or the Hold state, data and data signaling modules 328 may receive and process downlink data signaling in the downlink data channel segment 918. Multiple terminals, e.g., terminals corresponding to a broadcast group, may monitor the data channel at the same time in various embodiments such as in the case where multiple wireless terminals are members of the same broadcast group.

User data in downlink data channel segments 918 may include text information addressed to a group and wireless terminals may monitor for the group address to which the wireless terminal belongs. Hold state operation of a wireless terminal may also include receiving shared information, e.g. broadcast information addressed to a group in downlink segments 918. In some embodiments, in the hold state, various downlink signaling other than power control and timing control signaling may be sent by the base station in exemplary downlink channel segments 918 and monitored by the wireless terminals. In some embodiments, in the hold state, power control and timing control signaling may be restricted to be less than the on-state or not performed at all. In the hold state, the base station may select to reduce data signaling to wireless terminals and in such a case the base station may not transmit signaling in a downlink assignment channel segment to any wireless terminal during a downlink assignment signaling transition period. The data channel segment corresponding to an unused downlink assignment segment will go unused in such a case. In some embodiments, in a cell, the base station is operated to allocate over at least one one second time period more downlink data channel segments 918, e.g. used to communicate user data, to wireless terminals in the on state than to wireless terminals in the hold state. The user data may exclude timing and power control signals. In some embodiments, 75% of the downlink data channel signaling segments 918 during at least one one second time period are dedicated to wireless terminals in the on state. In other embodiments, 90% of the downlink data channel signaling segments 918 during at least one one second time period are dedicated to wireless terminals in the on state. In some embodiments, in the hold state, the base station allocates a portion of the downlink signaling resources to communicate data or information for purposes other than data downlink assignments and/or user data downlink transmissions.

Graph 942 shows an exemplary uplink power control signaling channel 944 on the vertical axis and time, represented by n segments, 946 on the horizontal axis. Graph 942 also shows exemplary uplink power control channel segments 948 and 950 that may be used for transmitting power control signaling, e.g. power control information, from a wireless terminal to a base station. The power control module 322 in the wireless terminal may be active in the on state, hold state, or, in some embodiments, the sleep state. This allows power control signaling to occur in each of these states, e.g., using uplink power control channel segments 948 and 950. Transmission power control and power control signaling module 322 is active in the wireless terminal during power control signal generation, transmission and reception operations.

Graph 962 shows an exemplary downlink power control signaling channel 964 on the vertical axis and time, represented by n segments, 966 on the horizontal axis. Graph 962 also shows exemplary downlink power control channel segments 968 and 970 that may be used for transmitting power control signaling, including power control information from a base station to a wireless terminal. The power control module 322 in the wireless terminal may be active in the on state, hold state, or, in some embodiments, sleep state. This allows downlink power control signaling to occur on the downlink power control channel segments 968 and 970. If transmission power control and power control signaling module 322 is active in the wireless terminal, the wireless terminal may receive and processes power control signaling during this operation.

In various embodiments, various power control signaling rates may apply in different states. In an exemplary case, assume that uplink power control signaling occurs in uplink power control signaling channel segments 948, 950 and that downlink power control signaling occurs in downlink power control signaling channel segments 968, 970. The time intervals between exemplary uplink power control signaling in segments 948, 950 may be used to define an uplink power control signaling rate, e.g., a wireless terminal transmitted power control signaling rate. The time intervals between exemplary downlink power control signaling in segments 968 and 970 may be used to define a downlink power control signaling rate, e.g., a base station power control signaling rate with respect to one wireless terminal. The ensemble, e.g., combination, of the power control signaling in both uplink and downlink channel segments 948, 950, 968, 970 over a given time represents the power control signaling rate since both uplink and downlink power control signals are part of the power control signaling process.

Power Control information may be communicated between the base station and the wireless terminal as previously discussed. With respect to the rate of communicating power control information between the base station and the wireless terminal, in some embodiments, the signaling rate is greater in the on state than in the hold state, and the signaling rate is higher in the in the hold state than in the sleep state. In some embodiments the signaling rate of communicating the power control information in the sleep state is 0, i.e. there is no power control information transfer in sleep state between the base station and the wireless terminal in some embodiments. In some embodiment, the power control information signaling rate in the on state is at least twice the rate in hold state. In some embodiments, the power control information signaling rate in the on state is at least twice the rate in hold state, and the rate in sleep state is less than the rate in hold state. In some embodiments, in the hold state, the power control signaling occurs at intervals at least 10 msec apart. In some embodiments, the rate of communicated power control information is controlled with respect to the on state and the sleep state, such that, the rate in the on state is greater than the rate in the sleep state. In still other embodiments power control and/or timing is not performed in the hold state or is performed at a rate lower than in the on state. Power control signaling and/or timing control signaling are not performed, in various embodiments, in the sleep state. Timing control may be performed in said sleep state at a lower rate than in said hold state.

Graph 972 shows an exemplary uplink timing control signaling channel 974 on the vertical axis and time, represented by n segments, 976 on the horizontal axis. Graph 972 also shows exemplary uplink timing control signaling channel segments 978 and 980 that may include uplink timing control signaling, including timing control information such as, e.g., clock synchronization information, from a wireless terminal to a base station. The wireless terminal may be in the on state or hold state when uplink timing control signaling occurs in uplink timing control signaling segments 978, 980. Timing control and timing control signaling module 324 is active in the wireless terminal during this operation, e.g., during the generation, receipt and/or processing of timing control signals.

Graph 982 shows an exemplary downlink timing control signaling channel 984 on the vertical axis and time, represented by n segments, 986 on the horizontal axis. Graph 982 also shows exemplary downlink timing control signaling channel segments 988 and 990 that may include downlink timing control signaling, including timing control information from a base station to a wireless terminal. The wireless terminal may be in the on state or hold state in order to be able to receive and process downlink timing control signaling in segments 988 and 990 when such signaling occurs. Timing control and timing control signaling module 324 is active in the wireless terminal when receiving and processing the signaling during this operation. Exemplary downlink timing control signaling segments 988 and 990 are dedicated segments by a base station to a specific wireless terminal to the exclusion of other wireless terminals in one embodiment.

In various embodiments, various timing control signaling rates may apply. In an exemplary case, assume that uplink timing control signaling occurs in uplink timing control signaling channel segments 978, 980 and that downlink timing control signaling occurs in downlink timing control signaling channel segments 988, 990. The time intervals between exemplary uplink timing control signaling in segments 978, 980 may be used to define an uplink timing control signaling rate, e.g., a rate at which timing control signals are generated by a wireless terminal. The time intervals between exemplary downlink timing control signaling in segments 988 and 990 may be used to define a downlink control signaling rate, e.g. a base station timing control signaling rate with respect to one wireless terminal. The combination of the timing control signaling in both uplink and downlink channel segments 978, 980, 988, 990 over a given time may be used in various embodiments to define a timing control signaling rate.

The invention supports, in various embodiments, timing control signaling between the base station and the wireless terminal in the on state and the hold state as previously described. In some embodiments, timing control is not performed in the hold state. In some embodiments, the rate of timing control signaling between the base station and the wireless terminal is greater than or equal to the timing control signaling rate in the hold state. In some embodiments, while in the on state, the power control information signaling rate, e.g., the wireless terminal transmitted power control signaling rate, is greater than or equal to the timing control signaling rate, e.g., the wireless terminal transmitted timing control signaling rate. In other embodiments, while in either the on state or the hold state, the power control signaling rate is greater than or equal to the timing control signaling rate.

In some embodiments, in the hold state, the wireless terminal does not receive any downlink dedicated communications resources, e.g., channel segments, other than the power control signaling channel segments 948, 950, 968, 970 and the timing control signaling channel segments 978, 980, 988, 990. In such an embodiment, in the hold state, a wireless terminal only receives downlink control signaling from the downlink resource that is shared by multiple wireless terminals, e.g., monitored by multiple wireless terminals. In such an embodiment, in the hold state, a wireless terminal does not receive downlink control signaling from any downlink resource that is dedicated to the wireless terminal.

In some embodiments, in the sleep state, zero downlink resources are dedicated to wireless terminals. In some embodiments, the timing control signaling, e.g. signaling in uplink segment 978, 980, and/or signaling in downlink segment 988 and 990 includes timing control messages which may be transmitted at non-regular time intervals.

In some embodiments the timing control signals are messages that may be transmitted at previously undetermined times. In some embodiments, the timing control resources are dedicated communications resources that have been assigned to a specific wireless terminal.

Graph 992 shows an exemplary dedicated uplink request signaling channel 994 on the vertical axis and time, represented by n segments, 996 on the horizontal axis. Graph 992 also shows an exemplary dedicated uplink request signaling channel segment 998 which may include uplink request signaling, including an uplink request from a wireless terminal to a base station. The uplink request may also be referred to as a paging request from the wireless terminal to the base station. The wireless terminal may, in some embodiments, be in the on state, hold state, or sleep state when an uplink request signaling occurs in uplink request signaling channel segment 998. In other embodiments, the wireless terminal is not allocated dedicated uplink request channel segments in the sleep state. The uplink request signaling in segment 998 may be, e.g., a request to change, e.g., from hold state to on or sleep state. The uplink request signaling in segment 998 may also be a request for increased bandwidth, which may be interpreted by the base station as a request to change state. Device status and status signaling module 326 is active in the wireless terminal during this operation. Uplink Request signaling channel 994 is a dedicated channel, so that the wireless terminal is assigned a dedicated channel segment 998 and will not have contention problems or associated delays when attempting to reach the base station. In some embodiments wireless terminals are assigned dedicated uplink request channel segments in the hold or on state. In some embodiments, during the hold state, a wireless terminal may transmit at most a small number of bits over dedicated uplink request signaling channel 994 during any one uplink signaling transmission period, e.g. segment 998. In one embodiment, during the hold state, a wireless terminal may transmit at most 8 bits over dedicated uplink request signaling channel 994 during any one uplink signaling transmission period, e.g. segment 998. In the hold state of operation, in some embodiments, the wireless terminal is allowed to let at least one dedicated uplink channel segment 998 to go unused, i.e., the wireless terminal does not transmit any signal into a dedicated uplink channel segment 998.

In some embodiments, operation in the hold state includes a dedicated uplink communications resource, e.g. segments 948, 950, 968, 970, 998, to transmit information in addition to power control and timing control information to the base station; this additional information may include state transition request and/or requests for additional bandwidth. In some embodiments, use of this hold state dedicated uplink resource e.g. segments 948, 950, 968, 970, 998 may be restricted to power control information, timing control information, and transition state request. In some embodiments, the Hold state dedicated uplink resource includes transmission segments, e.g., one or more segments from any of the segments 948, 950, 968, 970, 978, dedicated to the wireless terminal, some of which are allowed to go unused. In some embodiments, during hold state, state transitions requests are contention free due to the use of uplink communication resource segments 998 dedicated to the wireless terminal for transmission of state transition requests.

Graph 1002 shows an exemplary common uplink request signaling channel 1004 on the vertical axis and time, represented by n segments, 1006 on the horizontal axis. Graph 1002 also shows an exemplary common uplink request signaling segment 1006 that may include an uplink request from a wireless terminal to a base station. The uplink request signal may be referred to as a paging request signal from the wireless terminal to the base station. The wireless terminal may be in the on state, hold state, or sleep state when uplink request signaling occurs in the common uplink request channel segment 1006. The uplink request signaling in segment 1006 may be a request to change state. The uplink request signaling in segment 1006 may be a request for more bandwidth which may be interpreted by the base station as a request to change state, e.g., from sleep state to hold state. Device status and status signaling module 326 is active in the wireless terminal during this operation. Uplink Request signaling channel segment 1006 is a common or contention based channel segment; therefore, multiple wireless terminals may attempt or contend for the channel segment to transmit requests to the base station. If request attempts from multiple wireless terminals occur at the same time, collisions or interference between two wireless terminals requests signals may occur resulting in the wireless terminal having to retransmit the request attempt to the base station. In some embodiments of the invention, in the sleep mode, common uplink request channel segments 1006 are available to wireless terminals, but dedicated uplink request channel segments 998 are unavailable. In one embodiment, the wireless terminal, while in the sleep state, uses the common uplink request signaling segment 1006 to transmit a state change request signal to the base station, requesting a transition from sleep state to hold or on state. The transmission of an uplink channel resource request in segment 1006 may be performed as part of a transition from sleep state to hold or on state.

In some embodiments, in the hold state of operation, the wireless terminal has no dedicated downlink signaling resources, e.g., no dedicated downlink signaling channel segments. In such an embodiment, the base station, decides when to transmit downlink data on downlink data channel signaling segment 718.

Graph 922 shows an exemplary uplink assignment signaling channel 924 on the vertical axis and time, represented by n segments, 926 on the horizontal axis. The uplink assignment channel 924 may also be referred to as a paging notification channel. Graph 922 also shows exemplary uplink assignment channel signaling segments 928, 930 which may include uplink assignment signaling including information relating to the allocation of uplink resources for the communication of data from a wireless terminal to a base station, e.g. allocation of uplink data channel signaling segments 908 to the wireless terminal. The uplink assignment channel signaling in segments 928, 930 is periodically broadcast signaling from the base station to the wireless terminals. The signaling may include a notification to a wireless terminal, if its request signaling, for e.g. more bandwidth or state change, in uplink request channel segments 998 or 1006, has been granted by the base station. Assuming that the wireless terminal was in hold state, and request for more bandwidth has been granted, an ID for the wireless terminal is included in the uplink assignment channel segment, e.g., segment 928. There is a known preselected relationship between the notification signaling in the assignment channel, e.g., segment 928, and the allocation of an uplink data channel segment 908 to the wireless terminal for use by the wireless terminal to transmit data and information to the base station. In order for the wireless terminal to receive and processes uplink allocation signaling in segments 928, device status control and status signaling module 326 is active in the wireless terminal. In another example, the wireless terminal may also be in the on state and send a signaling request for increased uplink data bandwidth, to send more data to the base station, resulting in granted allocation signaling in uplink assignment segment 928.

In some embodiments, the interval between the request for resources and grant of resources may be a function of the state the wireless terminal is in or a function of whether the request signaling came over a dedicated segment 998 or a common segment 1006.

Graph 932 shows an exemplary downlink assignment channel 934 on the vertical axis and time, represented by n segments, 936 on the horizontal axis. Graph 932 also shows exemplary downlink assignment channel signaling segments 938 and 940 that may include downlink assignment signaling from a base station to one or a plurality of wireless terminal. The base station may periodically broadcast downlink assignment information including ID for specific wireless terminals. The ID may be an ID for a specific wireless terminal or may be a group ID applying to a group of wireless terminals. The wireless terminals may listen to the downlink assignment signaling in segments 938 and 940 and look for their ID. The wireless terminal may be in the on state or hold state to receive and process the downlink assignment signaling information in segments 938, 940. Data and data signaling module signaling module 328 is active in the wireless terminal and processes the received signaling during this operation. If a wireless terminal recognizes its ID in the signaling in the downlink assignment channel segment, e.g. segment 938, it knows to look for base station downlink data channel segments 918. There is a known preselecteed relationship between the notification signaling in the downlink assignment channel segment 938 and the transmission of the corresponding data in the downlink data channel segment 918, allowing the wireless terminal if monitoring to receive and process the corresponding data transmission in the downlink channel segment 918 which has been assigned via the notification signaling.

In some embodiments, the base station may allow at least some segment 938, 940 of downlink assignment channel 934 to go unused, e.g. the base station does not transmit any signals into some of the downlink assignment signaling segments 938, 940.

In the hold state, the wireless terminal may receive downlink signaling in segments 938, 940 other than timing control or power control information. The signaling in segments 938, 940 may be monitored by multiple wireless terminals for information.

Using the above discussed methods, monitoring, signal processing and power resources can be conserved in a mobile node 14, 16 through the use of multiple states of operation and through the use of multiple segmented control channels. In addition, limited control resources, e.g., bandwidth used for communicating control information from a base station to a mobile node, is used efficiently as a result of using multiple control channels, e.g., segmented control channels of the type described above.

Numerous variations on the above described methods and apparatus will be apparent to one of ordinary skill in the art in view of the above description of the invention. Such variations remain within the scope of the invention.

What is claimed is:

1. A method operating on at least a wireless terminal, the method comprising:
controlling said wireless terminal to operate, at different times, in each one of at least three different operational states, the three different operational states including a first state, a second state and a third state,
wherein operating said wireless terminal in the first state includes communicating power control information between said wireless terminal and a base station at a first rate;
wherein operating said wireless terminal in the second state includes communicating power control information between said wireless terminal and the base station at a second rate, the second rate being higher than zero and lower than the first rate;
wherein power control information is not communicated between said base station and said wireless terminal while said wireless terminal is operating in the third state or is communicated between said base station and said wireless terminal at a rate which is lower than said second rate; and
wherein operating said wireless terminal in at least one of said second and said third states includes operating said wireless terminal for at least a period of 10 ms during which said wireless terminal does not transmit any signals.

2. The method of claim 1, further comprising:
transitioning from one of said three states to another one of said three states in response to a change in user activity.

3. The method of claim 1, wherein said first state is an on state, the second state is a hold state and the third state is a sleep state.

4. The method of claim 1, wherein said change in user activity is entry of user input through a wireless terminal input device.

5. The method of claim 1,
wherein operating said wireless terminal in said third state includes using a first set of communications resources;
wherein operating said wireless terminal in said second state includes using the first set of communications resources used in said in third state and a second set of communications resources; and
wherein operating said wireless terminal in said first state includes using a third set of communications resources in addition to said first and second sets of communications resources.

6. The method of claim 5, wherein said first, second and third communications resources each include communications channel segments used by said wireless terminal.

7. The method of claim 1, wherein the rate of power control signaling between said base station and the wireless terminal is zero during operation of said wireless terminal in the third state.

8. The method of claim 1, wherein the rate of power control signaling performed in said first state is at least twice the rate of power control signal performed in said second state.

9. The method of claim 1, wherein power control signaling is performed in said second state at intervals at least 10 ms apart.

10. The method of claim 1, wherein operating said wireless terminal in said first state and in said second state includes:
communicating timing control signals between said base station and said wireless terminal.

11. The method of claim 10, wherein timing control signals are communicated between said base station and said wireless terminal during said first state at a rate that is at least as fast as the rate at which timing control signals are communicated between said base station and said wireless terminal during said second state.

12. The method of claim 10, wherein the rate of communicating timing control signals in said first state does not exceed the rate of communicating power control signals in said first state.

13. The method of claim 12, wherein the rate of communicating timing control signals in said second state does not exceed the rate of communicating power control signals in said second state.

14. The method of claim 10,
wherein said timing control signals are messages; and
wherein communicating timing control signals includes transmitting said messages at previously undetermined times.

15. The method of claim 10, wherein said timing control signals are transmitted using a dedicated communications resource assigned to said wireless terminal.

16. The method of claim 1, wherein said method further includes operating a base station, included in the same cell as said wireless terminal, to control transitions of said wireless terminal between at least two of said three states as a function of quality of service profile information associated with said wireless terminal.

17. A wireless terminal, comprising:
means for controlling said wireless terminal to operate, at different times, in each one of at least three different operational states, the three different operational states including a first state, a second state and a third state;
means for communicating power control information between said wireless terminal and a base station at a first rate while operating the wireless terminal in the first state;
means for communicating power control information between said wireless terminal and the base station at a second rate while operating the wireless terminal in the second state, the second rate being greater than zero and lower than the first rate;
wherein, while operating said wireless terminal in said second state, a dedicated uplink communications resource is utilized to transmit information to said base station, said dedicated uplink communications resource being in addition to any power signaling communication resource utilized by said base station during said second state;
wherein power control information is not communicated between said base station and said wireless terminal while said wireless terminal is operating in the third state or is communicated between said base station and said wireless terminal at a rate which is lower than said second rate; and
wherein operating the wireless terminal in at least one of said second and said third states includes operating said wireless terminal for at least a period of 10 ms during which said wireless terminal does not transmit any signals.

18. The wireless terminal of claim 17, further comprising:
a user input device; and
means for transitioning from one of said three states to another one of said three states in response to input from a user received entered via said user input device.

19. The wireless terminal of claim 18, wherein said first state is an on state, the second state is a hold state and the third state is a sleep state.

20. A method operating on at least a wireless terminal, the method comprising:
controlling said wireless terminal to operate, at different times, in each one of at least three different operational states, the three different operational states including an first state, a second state and a third state;
wherein operating the wireless terminal in the first state includes communicating power control information between said wireless terminal and a base station at a first rate;
wherein operating said wireless terminal in said second state, includes using a dedicated uplinik communications resource to transmit information to said base station, said dedicated uplinik communications resource being in addition to any power control signaling and timing control signaling communication resource used by said base station during said second state;
wherein power control is communicated between said base station and said wireless terminal at a rate which is non-zero and is lower than said first rate; and
wherein power control information is not communicated between said base station and said wireless terminal while said wireless terminal is operating in the third state or is communicated between said base station and said wireless terminal at a rate which is lower than said second rate.

21. The method of claim 20, further comprising:
transitioning from one of said three states to another one of said three states in response to a change in user activity.

22. The method of claim 20, wherein operating said wireless terminal in said second state includes limiting signaling using any available uplinik resource dedicated to said device, for purposes other than power control signaling and timing control signaling, to transmitting state transition requests to said base station.

23. The method of claim 20,
wherein said dedicated uplink communications resource includes transmission segments; and
wherein operating said wireless terminal in said second state includes allowing at least some transmission segments dedicated to said wireless terminal to go unused.

24. The method of claim 20, wherein said information transmitted using said dedicated uplinik communications resource during said second state includes state transition requests which are contention free due to the use of uplinik communications resource segments dedicated to said wireless terminal for transmission of said state transition requests.

25. The method of claim 20, wherein operating said wireless terminal during said second state includes:
receiving downlink signaling, other than timing control and power control signaling, using a communications channel which is monitored by multiple wireless terminals for data.

26. The method of claim 25, wherein said shared communication resource is a communications channel, wherein said downlink signal includes text information transmitted to multiple wireless terminals; and wherein said wireless terminal monitors said downlink for signals which are addressed to a group to which the wireless terminal belongs.

27. The method of claim 25, wherein during said second state, the base station may select to reduce downlink signaling to said wireless terminal and does not transmit a downlink channel segment assignment signal to any wireless terminal during a downlink assignment signal transmission period.

28. The method of claim 25, wherein during said second state, said wireless terminal does not receive any downlink resources dedicated exclusively to said wireless terminal other than downlink resources used for power control or timing control signaling.

29. The method of claim 28, wherein zero downlink resources are dedicated exclusively to said wireless terminal during said third state mode of operation.

30. The method of claim 20, wherein operating said wireless terminal in said third state includes using a common uplinik signaling resource to transmit a state change request signal to said base station.

31. The method of claim 30, wherein using said common uplinik signaling resource to transmit a state change request signal includes performing contention based signaling as part of a process of transitioning from the third state to one of the first state and the second state.

32. The method of claim 20, wherein said method further includes operating a base station included in the same cell as said wireless terminal, operating said base station including:
controlling the base station to allocate, over at least one one-second time period, more downlink communications resources used to communicate user data from the base station to wireless terminals in said cell which are in the first state, than which are in said second state.

33. The method of claim 32, wherein user data does not include power control and timing control signals.

34. The method of claim 32, wherein at least 75 percent of the downlink communications resources are allocated by said base station during said at least one one-second time period, to wireless terminals in said first state.

35. The method of claim 32, wherein at least 90 percent of the downlink communications resources are allocated during said one one-second time period by said base station to wireless terminals in said first state.

36. The method of claim 32, wherein the base station allocates at least some downlink communications resources, used to communicate data from said base station to wireless terminals in said second state, said downlink communications resources used to communicate data being different from control communications resources used to control wireless terminal signaling activity.

37. The method of claim 20, wherein said method further includes operating a base station, included in the same cell as said wireless terminal, to allocate zero dedicated uplink data communications resources to wireless terminals in said second state, said uplink data communications resources being different from timing control and power control communications resources.

38. The method of claim 20, wherein said method further includes operating a base station, included in the same cell as said wireless terminal, to control transitions of said wireless terminal between at least two of said three states as a function of quality of service profile information associated with said wireless terminal.

39. The method of claim 38, wherein transitions of said wireless terminal between at least two of said three states is controlled as a function of quality of service profile information associated with multiple wireless terminals.

40. The method of claim 38, wherein said base station further controls transitions of said wireless terminal between at least two of said three states as a function of traffic quality of service profile information associated with said wireless terminal.

41. The method of claim 20, wherein operating said wireless terminal further includes:
controlling transitions of said wireless terminal between at least two of said three states as a function of quality of service profile information associated with said wireless terminal.

42. A wireless terminal comprising:
means for controlling said wireless terminal to operate, at different times, in each one of at least three different operational states, the three different operational states including an first state, a second state and a third state;
means for communicating power control information between said wireless terminal and a base station at a first rate while operating the wireless terminal in the first state;
means for using a dedicated uplinik communications resource to transmit information to said base station, while operating said wireless terminal in said second state, said dedicated uplinik communications resource being in addition to any power control signaling and timing control signaling communication resource used by said base station during said second state;
wherein power control information is communicated between said base station and said wireless terminal at a rate which is greater than zero and lower than said first rate; and
wherein power control information is not communicated between said base station and said wireless terminal while said wireless terminal is operating in the third state or is communicated between said base station and said wireless terminal at a rate which is lower than said second rate.

43. The wireless terminal of claim 42, further comprising:
a user input device; and
means for controlling transitions from one of said three states to another one of said three states in response to user input received from said user input device.

44. The wireless terminal of claim 43, further comprising:
means for operating said wireless terminal in said second state includes limiting signaling using any available uplinik resource dedicated to said wireless terminal, for purposes other than power control signaling and timing control signaling, to transmitting state transition requests to said base station.

45. An apparatus comprising:
a processor configured to operate, at different times, in each one of at least three different operational states, the three different operational states including a first state, a second state and a third state;
wherein operating said processor, associated with a wireless terminal in the first state includes communicating power control information between said wireless terminal and a base station at the a first rate;
wherein operating said processor in said second state, includes using a dedicated uplinik communications resource to transmit information to said base station, said dedicated uplinik communications resource being in addition to any power control signaling and timing control signaling communication resource used by said base station during said second state;
wherein while said processor is operating in the second state, power control information is communicated between said base station and said wireless terminal at a second rate which is non-zero and which is lower than said first rate; and
wherein power control information is not communicated between said base station and said wireless terminal while said processor is operating in the third state or is communicated between said base station and said wireless terminal at a rate which is lower than said second rate.

46. A method operating on at least a wireless terminal, the method comprising:
controlling the wireless terminal to operate, at different times, in each one of at least three different operational states, the three different operational states including a first state, a second state and a third state;

wherein operating the wireless terminal in the first state includes communicating power control information between said wireless terminal and a base station at a first rate;

wherein operating said wireless terminal in said second state, including using a dedicated uplinik communications resource to transmit information to said base station, said dedicated uplinik communications resource being in addition to any power signaling communication resource used by said base station during said second state;

wherein while said wireless terminal is operating in the second state, power control information is communicated between said base station and said wireless terminal at a rate which is non-zero and which is lower than said first rate; and wherein power control information is not communicated between said base station and said wireless terminal while said wireless terminal is operating in the third state or is communicated between said base station and said wireless terminal at a rate which is lower than said second rate.

47. A wireless terminal comprising:

a control module for controlling said wireless terminal to operate, at different times, in each one of at least three different operational states, the three different operational states including a first state, a second state and a third state;

a power control communications module for communicating power control information between said wireless terminal and a base station at a first rate while operating the wireless terminal in the first state;

an uplinik communications module for using a dedicated uplinik communications resource to transmit information to said base station, while operating said wireless terminal in said second state, said dedicated uplinik communications resources being in addition to any power control signaling and timing control signaling communication resource used by said base station during said second state;

wherein while said wireless terminal is operating in the second state power control information is communicated between said base station and said wireless terminal at a second rate which is non-zero and which is lower than said first rate; and wherein power control information is not communicated between said base station and said wireless terminal while said wireless terminal is operating in the third state or is communicated between said base station and said wireless terminal at a rate which is lower than said second rate.

* * * * *